(12) United States Patent
Murugesan et al.

(10) Patent No.: US 10,413,966 B2
(45) Date of Patent: Sep. 17, 2019

(54) NANOPARTICLES HAVING MAGNETIC CORE ENCAPSULATED BY CARBON SHELL AND COMPOSITES OF THE SAME

(71) Applicant: Baker Hughes Incorporated, Houston, TX (US)

(72) Inventors: Sankaran Murugesan, Katy, TX (US); Oleksandr Kuznetsov, Houston, TX (US); Valery Khabashesku, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 15/187,603

(22) Filed: Jun. 20, 2016

(65) Prior Publication Data
US 2017/0361376 A1    Dec. 21, 2017

(51) Int. Cl.
*B22F 1/02*    (2006.01)
*B22F 1/00*    (2006.01)
(Continued)

(52) U.S. Cl.
CPC .................. *B22F 1/02* (2013.01); *B01J 13/02* (2013.01); *B01J 13/22* (2013.01); *B22F 1/0018* (2013.01);
(Continued)

(58) Field of Classification Search
CPC ............. E21B 47/0905; E21B 47/1015; E21B 47/102; E21B 43/267; B22F 1/0018; B22F 1/0044; H01F 1/0054
(Continued)

(56) References Cited

U.S. PATENT DOCUMENTS 1,570,537 A    1/1926    Teitsworth
2,378,155 A    6/1945    Newsome
(Continued)

FOREIGN PATENT DOCUMENTS

CA    1262507    10/1989
CA    2588862 A1    6/2006
(Continued)

OTHER PUBLICATIONS

P.J.C. Webb AEA Technology PLC, T.A., et al., Revolutionary New Chemical Delivery System for Fractured, Gravel Packed and Prepacked Screen Wells, SPE 38164, 1997.
(Continued)

*Primary Examiner* — Kenneth L Thompson
(74) *Attorney, Agent, or Firm* — John Wilson Jones; Jones Delflache LLP

(57) ABSTRACT

Nanoparticles for use in the treatment of a well have a magnetic core of iron, nickel or cobalt or an alloy thereof; a carbon shell encapsulating the magnetic core; at least one organic functional group on the surface of the carbon shell through covalent bonding; and a coating of amorphous carbon nitride encapsulating the functionalized carbon shell. The nanoparticles may be used to identify fluids produced from the reservoir, identify the zone within the reservoir from which recovered fluid is produced, in water flooding to determine water breakthrough in the production well and to identify those injection wells from which breakthrough water originates.

23 Claims, 12 Drawing Sheets

(51) Int. Cl.
*B01J 13/02* (2006.01)
*B01J 13/22* (2006.01)
*C09B 67/02* (2006.01)
*B22F 7/06* (2006.01)

(52) U.S. Cl.
CPC ........ *B22F 1/0062* (2013.01); *C09B 67/0097* (2013.01); *B22F 7/06* (2013.01); *B22F 2999/00* (2013.01)

(58) Field of Classification Search
USPC ........................................................ 148/105
See application file for complete search history.

(56) References Cited

U.S. PATENT DOCUMENTS

| | | |
|---|---|---|
| 3,179,170 A | 4/1965 | Burtch et al. |
| 3,283,817 A | 11/1966 | Roberts |
| 3,782,469 A | 1/1974 | Fulford |
| 3,850,248 A | 11/1974 | Carney |
| 3,991,827 A | 11/1976 | Schall |
| 4,008,763 A | 2/1977 | Lowe, Jr. |
| 4,013,587 A | 3/1977 | Fischer et al. |
| 4,108,779 A | 8/1978 | Carney |
| 4,109,721 A | 8/1978 | Slusser |
| 4,264,329 A | 4/1981 | Beckett |
| 4,352,741 A | 10/1982 | Wernau |
| 4,390,456 A | 6/1983 | Sanchez et al. |
| 4,552,591 A | 11/1985 | Millar |
| 4,582,131 A | 4/1986 | Plummer et al. |
| 4,660,645 A | 4/1987 | Newlove et al. |
| 4,670,166 A | 6/1987 | McDougall et al. |
| 4,738,897 A | 4/1988 | McDougall et al. |
| 4,905,762 A | 3/1990 | Zilch |
| 4,986,353 A | 1/1991 | Clark et al. |
| 5,073,276 A | 12/1991 | Newlove et al. |
| 5,102,558 A | 4/1992 | McDougall et al. |
| 5,187,011 A | 2/1993 | Manalastas et al. |
| 5,224,543 A | 7/1993 | Watkins et al. |
| 5,225,123 A | 7/1993 | Torobin |
| 5,243,190 A | 9/1993 | Bandy et al. |
| 5,741,758 A | 4/1998 | Pakulski |
| 5,758,725 A | 6/1998 | Streetman |
| 5,892,147 A | 4/1999 | Garnes et al. |
| 5,893,416 A | 4/1999 | Read |
| 5,922,652 A | 7/1999 | Kowalski et al. |
| 5,964,291 A | 10/1999 | Bourne et al. |
| 6,025,302 A | 2/2000 | Pakulski |
| 6,209,643 B1 | 4/2001 | Nguyen et al. |
| 6,209,646 B1 | 4/2001 | Reddy et al. |
| 6,279,656 B1 | 8/2001 | Sinclair et al. |
| 6,326,335 B1 | 12/2001 | Kowalski et al. |
| 6,331,508 B1 | 12/2001 | Pakulski |
| 6,380,136 B1 | 4/2002 | Bates et al. |
| 6,439,310 B1 | 8/2002 | Scott, III et al. |
| 6,527,051 B1 | 3/2003 | Reddy et al. |
| 6,613,899 B1 | 9/2003 | Kuzzee et al. |
| 6,723,683 B2 | 4/2004 | Crossman et al. |
| 6,866,797 B1 | 3/2005 | Martin et al. |
| 7,028,776 B2 | 4/2006 | Kirk |
| 7,270,184 B2 | 9/2007 | Kolter et al. |
| 7,347,260 B2 | 3/2008 | Ferguson |
| 7,380,606 B2 | 6/2008 | Pursley |
| 7,419,937 B2 | 9/2008 | Rimmer et al. |
| 7,426,961 B2 | 9/2008 | Stephenson et al. |
| 7,459,209 B2 | 12/2008 | Smith et al. |
| 7,491,682 B2 | 2/2009 | Gupta et al. |
| 7,493,955 B2 | 2/2009 | Gupta et al. |
| 7,494,711 B2 | 2/2009 | Kaufman et al. |
| 7,560,690 B2 | 7/2009 | Stray et al. |
| 7,598,209 B2 | 10/2009 | Kaufman et al. |
| 7,686,081 B1 | 3/2010 | Becker |
| 7,861,601 B2 | 1/2011 | Sale et al. |
| 7,896,078 B2 | 3/2011 | Wang et al. |
| 7,977,283 B2 | 7/2011 | Gupta et al. |
| 8,664,168 B2 | 3/2014 | Steiner |
| 8,801,954 B2* | 8/2014 | Iftime ................... H01F 1/0054 106/31.32 |
| 9,029,300 B2 | 5/2015 | Gupta |
| 9,053,849 B2 | 6/2015 | Nayfeh et al. |
| 9,102,860 B2 | 8/2015 | Cawiezel et al. |
| 9,133,709 B2* | 9/2015 | Huh ...................... E21B 47/1015 |
| 9,194,226 B2* | 11/2015 | Blair ................... E21B 47/1015 |
| 9,206,683 B2* | 12/2015 | Blair ................... E21B 47/1015 |
| 9,284,833 B2 | 3/2016 | Hewitt et al. |
| 9,656,237 B2 | 5/2017 | Shen et al. |
| 9,704,625 B2* | 7/2017 | Liu ....................... B22F 1/0018 |
| 9,715,036 B2 | 7/2017 | Murugesan et al. |
| 9,803,135 B2* | 10/2017 | Barron ..................... C09K 8/80 |
| 9,938,448 B2* | 4/2018 | Crews ...................... C09K 8/50 |
| 2002/0128157 A1 | 9/2002 | Bates et al. |
| 2003/0006036 A1 | 1/2003 | Malone et al. |
| 2004/0043906 A1 | 3/2004 | Heath et al. |
| 2004/0060702 A1 | 4/2004 | Kotlar et al. |
| 2004/0074646 A1 | 4/2004 | Kotlar et al. |
| 2004/0162224 A1 | 8/2004 | Nguyen et al. |
| 2004/0224155 A1 | 11/2004 | Barron et al. |
| 2004/0244969 A1 | 12/2004 | Koltar et al. |
| 2005/0022991 A1 | 2/2005 | Rao |
| 2005/0028976 A1 | 2/2005 | Nugyen et al. |
| 2005/0034868 A1 | 2/2005 | Frost et al. |
| 2005/0111805 A1 | 5/2005 | Hertz et al. |
| 2005/0115710 A1 | 6/2005 | Koltar et al. |
| 2006/0065396 A1 | 3/2006 | Dawson et al. |
| 2006/0091572 A1 | 5/2006 | Santra et al. |
| 2006/0124301 A1 | 6/2006 | Gupta |
| 2006/0124302 A1 | 6/2006 | Gupta |
| 2007/0036977 A1 | 2/2007 | Sinclair et al. |
| 2007/0039732 A1 | 2/2007 | Dawson et al. |
| 2007/0095528 A1 | 5/2007 | Ziauddin et al. |
| 2007/0173417 A1 | 7/2007 | Kaufman et al. |
| 2007/0202318 A1 | 8/2007 | Smith et al. |
| 2008/0035339 A1 | 2/2008 | Welton et al. |
| 2008/0035340 A1 | 2/2008 | Welton et al. |
| 2008/0053657 A1 | 3/2008 | Alary et al. |
| 2008/0058228 A1 | 3/2008 | Wilson |
| 2008/0058229 A1 | 3/2008 | Berkland et al. |
| 2008/0078547 A1 | 4/2008 | Sinclair et al. |
| 2008/0182765 A1 | 7/2008 | Pershikova et al. |
| 2008/0217012 A1 | 9/2008 | Delorey et al. |
| 2008/0287324 A1 | 11/2008 | Pursley et al. |
| 2009/0025470 A1 | 1/2009 | Green et al. |
| 2009/0114247 A1 | 5/2009 | Brown et al. |
| 2009/0131285 A1 | 5/2009 | Wang et al. |
| 2009/0288820 A1* | 11/2009 | Barron .................... B01J 13/02 166/249 |
| 2009/0291861 A1 | 11/2009 | Sawdon |
| 2009/0308610 A1 | 12/2009 | Windebank et al. |
| 2009/0325825 A1 | 12/2009 | Gupta et al. |
| 2010/0059224 A1 | 3/2010 | Palamara et al. |
| 2010/0175875 A1 | 7/2010 | Becker et al. |
| 2010/0304418 A1 | 12/2010 | Moussavi et al. |
| 2010/0307745 A1 | 12/2010 | Lafitte et al. |
| 2011/0146974 A1 | 1/2011 | Hartshorne et al. |
| 2011/0214488 A1 | 9/2011 | Rose et al. |
| 2012/0012326 A1 | 1/2012 | Darby et al. |
| 2012/0015852 A1 | 1/2012 | Quintero |
| 2012/0181029 A1 | 7/2012 | Saini et al. |
| 2012/0211365 A1 | 8/2012 | Joung et al. |
| 2012/0252706 A1 | 10/2012 | Steiner |
| 2012/0318503 A1 | 12/2012 | Kanj et al. |
| 2012/0318515 A1 | 12/2012 | Cawiezel et al. |
| 2013/0029883 A1 | 1/2013 | Dismuke et al. |
| 2013/0126158 A1 | 5/2013 | Gupta et al. |
| 2013/0341012 A1 | 12/2013 | Belani et al. |
| 2014/0132376 A1* | 5/2014 | Jin ........................ H01F 1/0552 335/302 |
| 2014/0220563 A1 | 8/2014 | McCann et al. |
| 2014/0226404 A1 | 8/2014 | Lee et al. |
| 2014/0249053 A1 | 9/2014 | Robinson et al. |
| 2015/0090456 A1 | 4/2015 | Turkenburg et al. |
| 2015/0153472 A1 | 6/2015 | Tour et al. |
| 2015/0218001 A1 | 8/2015 | Wang et al. |
| 2015/0218435 A1 | 8/2015 | Suresh et al. |

(56) References Cited

U.S. PATENT DOCUMENTS

| | | | |
|---|---|---|---|
| 2015/0232750 A1 | 8/2015 | Kanj et al. | |
| 2015/0322776 A1* | 11/2015 | Blair | E21B 43/26 166/250.12 |
| 2015/0330197 A1 | 11/2015 | Brannon et al. | |
| 2015/0361334 A1 | 12/2015 | Kwon et al. | |
| 2015/0368539 A1 | 12/2015 | Tour et al. | |
| 2016/0030916 A1 | 2/2016 | Shen et al. | |
| 2016/0097750 A1* | 4/2016 | Van Herzen | G01N 31/22 166/250.12 |
| 2016/0141083 A1* | 5/2016 | Ito | C22C 33/02 252/62.55 |
| 2016/0340569 A1* | 11/2016 | Belcher | C09K 8/584 |
| 2016/0376492 A1 | 12/2016 | Chakraborty et al. | |
| 2017/0022804 A1 | 1/2017 | Gupta et al. | |
| 2017/0253789 A1* | 9/2017 | Crews | C09K 8/516 |
| 2017/0314388 A1 | 11/2017 | Murugesan et al. | |
| 2017/0350236 A1 | 12/2017 | Shen et al. | |
| 2017/0361376 A1 | 12/2017 | Murugesan et al. | |

FOREIGN PATENT DOCUMENTS

| | | |
|---|---|---|
| CA | 2410398 C | 4/2009 |
| CN | 101973541 A | 2/2011 |
| CN | 101973541 B | 9/2012 |
| CN | 103100725 A | 5/2013 |
| CN | 103143035 A | 6/2013 |
| CN | 103143377 A | 6/2013 |
| CN | 103172051 A | 6/2013 |
| CN | 103143377 B | 11/2014 |
| CN | 03100725 B | 3/2015 |
| EP | 0540204 A2 | 5/1993 |
| EP | 1277051 B1 | 8/2006 |
| GB | 2298440 | 9/1996 |
| GB | 2520018 | 5/2015 |
| WO | 99/36668 A1 | 7/1999 |
| WO | 99/54592 | 10/1999 |
| WO | 200011949 A1 | 3/2000 |
| WO | 0181914 A1 | 11/2001 |
| WO | 2002040827 A1 | 5/2002 |
| WO | 2004048969 A1 | 6/2004 |
| WO | 2004106942 A2 | 12/2004 |
| WO | 2005/017313 A1 | 2/2005 |
| WO | 2006129258 A1 | 12/2006 |
| WO | 2008032067 A1 | 3/2008 |
| WO | 2010007390 A2 | 1/2010 |
| WO | 2011162939 A2 | 6/2011 |
| WO | 2012071462 A1 | 5/2012 |
| WO | 2013052891 A2 | 4/2013 |
| WO | 2013138622 A2 | 9/2013 |
| WO | 2015200789 A1 | 12/2015 |
| WO | 2016014310 A1 | 1/2016 |

OTHER PUBLICATIONS

P.J.C. Webb AEA Technology PLC, T.A., et al., Economic and Technical Advantages of Revolutionary New Delivery System for Fractured and Gravel Packed Wells, SPE 38548, 1997.
P.J.C. Webb AEA Technology PLC T.A., et al., Economic and Technical Features of a Revolutionary Chemical Scale Inhibitor Delivery Method for Fractured and Gravel Packed Wells: Comparative Analysis of Onshore and Offshore Subsea Applications, SPE 39451, 1998.
Norris, et al., Maintaining Fracture Performance Through Active Scale Control, SPE 68300, 2001.
Norris, et al., Hydraulic Fracturing for Reservoir Management Production Enhancement, Scale Control and Asphaltine Prevention, SPE 71655, 2001.
McInnich, et al., New Relationship Between Oil Company and Service Company Rejuvenates a Mature North Sea Gas Field, SPE 78327, 2002.
Szymczak, et al., Long-Term Scale Inhibition Using a Solid Scale Inhibitor in a Fracture Fluid, SPE 102720, 2006.
Gupta, et al., Solid Production Chemicals Added With the Frac for Scale, Paraffin and Asphaltene Inhibition, SPE 119393, 2009.
Gupta, et al., Multi-Year Scale Inhibition from a Solid Inhibitor Applied during Stimulation, SPE 115655, 2008.
Smith, et al., Solid Paraffin Inhibitor Pumped in a Hydraulic Fracture Provides Long-Term Paraffin Inhibition in Permian Basin Wells, SPE 124868, 2009.
Pallanich, Slow-release medication relieves deepwater headache, Offshore Engineer, Aug. 2007.
Szymczak, et al., Treat production problems before they occur, E&P, Jul. 2008.
Weirich, et al., Field Application of Chemically Treated Substrate in Pre-Packed Well Screen, SPE 141054, Society of Petroleum Engineers, Manama Bahrain, Mar. 2011.
Sasol Germany GmbH, Boehmite, High Purity Alumina and Hydrotalcite, Sasol Germany GmbH, Hamburg, Germany.
Sasol, Aluminum Oxied, A1203, Material Safety Data Sheet, Version 1.2, Sasol, Hamburg, Germany, Aug. 2007.
Carbo Ceramics, Carbo EconoProp, Carbo Ceramics, Houston, Texas, 2010.
Frigo, D.M., et al., Chemical Inhibition of Halite Scaling in Topsides Equipment, SPE 60191, 2000.
Rahmani, et al., Crosswell Magnetic Sensing of Superparamagnetic Nanoparticles for Subsurface Applications, SPE 166140, 2014.
Khabashesku, et al., Powder Synthesis and Characterization of Amorphous Carbon Nitride, Chem. Mater., 2000, 12, 3264-3270, 2000.
Peng, et al., Sidewall Carboxylic Acid Functionalization of Single-Walled Carbon Nanotubes, J. Am. Chem. Soc., 125, No. 49, 2003.
Zimmerman, et al., Synthesis of Spherical Carbon Nitride Nanostructures, NANO Letters, 1, No. 12, 2001.
MacQueen, D. Brent, Optically Coded Magnetic Nanoparticles as Well-to-Well Tracers, SRI International, Apr. 2016.
Abbaszadeh-Dehghani et al., Analysis of Well-to-Well Tracer Flow to Determine Reservoir Layering, Journal of Petroleum Technology, vol. 36, Issue 10, pp. 1753-1762, 1984.
Agenet et al., Fluorescent Nanobeads: a First Step Toward Intelligent Water Tracers, Society of Petroleum Engineers, SPE International Oilfield Nanotechnology Conference and Exhibition, 12-14, SPE-157019-MS, 13 pages, Jun. 2012.
Aref et al., An Improved Fiber Optic Pressure and Temperature Sensor for Downhole Application, Measurement Science and Technology, vol. 20, 7 pages, 2009.
Baker et al., Luminescent Carbon Nanodots: Emergent Nanolights, Angew. Chem. Int. Ed., vol. 49, pp. 6726-6744, 2010.
Bourlinos et al., Photoluminescent Carbogenic Dots, Chem. Mater., vol. 20, pp. 4539-4541, 2008.
Ghori et al., Well-To-Well Tracer Test and Permeability Heterogeneity, The Journal of Canadian Petroleum Technology, vol. 37, No. 1, pp. 32-43, 1998.
Ghori et al., The Well-to-Well Tracer Tests to Determine Geostatistical Parameter of Permeability, Society of Petroleum Engineers, SPE/DOE Enhanced Oil Recovery Symposium, SPE 24138, pp. 347-357, Apr. 22-24, 1992.
Li et al., Carbon Nanodots: Synthesis, Properties and Applications, J. Mater. Chern, vol. 22, pp. 24230-24253, 2012.
Liu et al., Fluorescent Carbon Nanoparticles Derived from Candle Soot, Angew. Chem. Int. Ed., vol. 46, pp. 6473-6475, 2007.
Mahler et al., Use of Single-Well Tracer Dilution Tests to Evaluate LNAPL Flux at Seven Field Sites, Ground Water, vol. 50, No. 6, pp. 851-860, Nov.-Dec. 2012.
Raghuraman et al., Real-Time Downhole pH Measurement Using Optical Spectroscopy, Reservoir Evaluation & Engineering, pp. 302-311, 2013.
Sale et al., Measurement of LNAPL Flow Using Single-Well Tracer Dilution Techniques, Ground Water, vol. 45, No. 5, pp. 569-578, Sep.-Oct. 2007.
Smith, Tim, Thesis entitled Direct Measurement of LNAPL Flow Using Single Well Periodic Mixing Reactor Tracer Tests, Department of Civil and Environmental Engineering, Colorado State University, 120 pages, 2008.

(56) References Cited

OTHER PUBLICATIONS

Sun et al., Quantum-Sized Carbon Dots for Bright and Colorful Photoluminescence, J. Am. Chem. Soc., vol. 128, pp. 7756-7757, 2006.

Tomich et al., Single-Well Tracer Method to Measure Residual Oil Saturation, Journal of Petroleum Technology, pp. 211-218, Feb. 1973.

Zhou et al., An Electrochemical Avenue to Blue Luminescent Nanocrystals from Multiwalled Carbon Nanotubes (MWCNTs), J. Am. Chern. Soc., vol. 129, pp. 744-745, 2007.

Murugesan, et al., Fluorescence Properties of Hybrid Core-Shell Super-paramagnetic Fe@C-CNx Nanoparticles, ACS Spring Meeting Final After OPS review, Mar. 2016.

Murugesan, et al., Fluorescence Properties of Hybrid Core-Shell Superparamagnetic Fe@C-CNx Particles, Abstract, Baker Hughes, Mar. 2016.

Wikipedia, Quantum Dot, http://wikipedia.or/wiki/Quantum_dot, 17 pages, visited May 4, 2015.

Princeton Instruments, Time-Resolved Fluorescence Spectroscopy, http://www.princetoninstruments.com/Uploads/Princeton/Documents/Library/UpdatedLibrary/Time_resolved_fluorescence_spectroscopy.pdf, 3 pages, visited May 4, 2015.

Turner Designs, Technical Note: An Introduction to Fluorescence Measurements, http://www.turnerdesigns.com/t2/doc/appnotes/998-0050.pdf,15 pages, visited May 5, 2015.

Nyhavy, et al., Permanent Tracers Embedded in Downhole Polymers Prove Their Monitoring Capabilities in a Hot Offshore Well, SPE International, SPE 135070, 2010.

Fuller, et al., Applying Biochemistry Concepts to the Analysis of Oilfield Produced Fluids, SPE International, SPE 124749, 2009.

Berlin et al., Engineered Nanoparticles for Hydrocarbon Detection in Oil-Field Rocks, SPE International, SPE 141528, 2011.

\* cited by examiner

1A

1B

1C

1D

9a

9b und COMPOSITES OF THE SAME

NANOPARTICLES HAVING MAGNETIC CORE ENCAPSULATED BY CARBON SHELL AND COMPOSITES OF THE SAME

FIELD OF THE DISCLOSURE

Embodiments of the disclosure relate generally to spherical nanoparticles having a magnetic core and a carbon nitride coating on a carbon shell encapsulating the magnetic core and at least one functional group attached to the surface of the carbon shell for attaching the carbon nitride coating onto the carbon shell. Other embodiments of the disclosure relate to processes of preparing the spherical nanoparticles and methods of using the spherical nanoparticles to enhance the productivity of hydrocarbon-containing fluids from the subterranean formations.

BACKGROUND OF THE DISCLOSURE

Reservoir monitoring refers to the gathering and analysis of information from fluids produced during the treatment of a subterranean formation penetrated by a well.

In multi-zone fracturing operations, reservoir monitoring has been used to assess the productivity of zones from which fluids are being produced. In addition, reservoir monitoring is often used to prevent the inadvertent flow of fluids into a non-productive zone or a zone of diminished interest. Selective stimulation becomes pronounced as the life of the well declines and productivity of the well decreases. Monitoring of produced fluids is also often used to determine water saturation levels in the well. In addition, reservoir monitoring provides an understanding of the dynamics of hydraulic fracture placement and subsequent fluid flowback and clean up.

Further, reservoir monitoring is used to determine in-situ downhole conditions. For example, the measurement of the pH of produced fluids may be indicative scale build-up within the well (high pH) and corrosion of wellbore equipment (low pH). Conventionally, the pH of the formation fluid is determined by obtaining a sample of the formation fluid and analyzing the sample in a laboratory. However, as the formation fluid is brought from formation conditions (e.g., high temperature high pressure conditions), acid gases and salts may come out of solution, irreversibly changing the pH of the sample. Thus the analyzed sample may not be an accurate representation of the pH of the formation fluid at formation conditions.

In the past, produced fluids have been monitored and downhole conditions have been assessed by the use of nanosize chemicals. Such monitoring methods have included the introduction of dyes (e.g., phenol red, methylene blue, and/or cresol red) as nanosize chemicals into the formation and correlating the pH of the formation fluid to the color of the dye. However, most dyes are chemically unstable under formation conditions and are also inaccurate. For example, some dyes are sensitive only within a narrow pH.

Flurophores (compounds that can re-emit light upon light excitation) have also been used as nanosize chemicals and particles. The presence of nanoparticles in produced fluids may be determined by optical spectroscopy (absorbance, fluorescence and phosphorescence). In the past, fluorophores have included organic molecules and rare-earth complexes that are toxic and/or radioactive and thus contaminate the formation (e.g., aquifers located in the subterranean formation). Further, fluorophores often are decomposed at downhole conditions and thus are the subject of photobleaching (i.e., the photochemical alteration of the fluorophore such that it becomes permanently unable to fluoresce) and photo blinking (i.e., fluorescence intermittency). The use of fluorophores are thus only useful for a short time following placement of the nanoparticle within the well and thus are restricted to near-wellbore production activity.

Alternative methods of monitoring produced fluids in well treatment applications are therefore desired.

SUMMARY OF THE DISCLOSURE

Embodiments disclosed herein include nanoparticles, processes of preparing nanoparticles and methods of using the nanoparticles for determining at least one property of a subterranean formation. Additional embodiments disclosed herein include methods of enhancing the productivity of hydrocarbon containing fluids from a subterranean formation using the nanoparticles.

For example, in accordance with one embodiment, a spherical nanoparticle is provided. The spherical nanoparticles has a magnetic core of iron, nickel or cobalt or an alloy thereof, a carbon shell encapsulating the magnetic core, at least one organic functional group on the surface of the carbon shell attached through covalent bonding, and a coating of amorphous carbon nitride encapsulating the functionalized carbon shell through chemical reaction.

In another embodiment, a nanoparticle is disclosed having a magnetic core of iron carbide or metallic iron of zero oxidation, a carbon shell encapsulating the magnetic core (wherein the carbon shell is a diamond-like, graphene or graphene oxide), and carbon nitride encapsulating the carbon shell wherein the carbon nitride is attached to the carbon shell by at least one functional group.

In another embodiment, a plasmonic nanoparticle is disclosed having a magnetic core of iron carbide or metallic iron of a zero oxidation state, the diameter of the magnetic core being from about 5 nm to about 100 nm; a protective carbon shell encapsulating the magnetic core, the thickness of the protective carbon shell being from about 1 nm to about 100 micron; and a luminescent amorphous carbon nitride coating encapsulating the carbon shell, the carbon nitride coating being attached to the carbon shell by an alkyl carboxylic acid wherein the thickness of the amorphous carbon nitride coating is from about 1 nm to about 1 micron.

In another embodiment, a composite is disclosed comprising (a) a spherical nanoparticle having (i) a magnetic core of iron, nickel or cobalt or an alloy thereof; (ii) a carbon shell encapsulating the magnetic core, at least one organic functional group attached onto the surface of the carbon shell through covalent bonding, and (iii) a coating of amorphous carbon nitride encapsulating the functionalized carbon shell through chemical reaction; (b) a porous adsorbent, the nanoparticle being adsorbed and immobilized into the pores of the porous adsorbent; and (c) a polymeric coating encompassing the adsorbent.

In another embodiment, a composite is provided comprising (a) spherical nanoparticle having (i) a magnetic core of iron carbide or metallic iron of zero oxidation, (ii) a carbon shell encapsulating the magnetic core, the carbon shell being diamond-like, graphene or graphene oxide, and (iii) carbon nitride encapsulating the carbon shell wherein the carbon nitride is attached to the carbon shell by at least one functional group; (b) a porous adsorbent, the nanoparticle being adsorbed and immobilized into the pores of the porous adsorbent; and (c) a polymeric coating encompassing the adsorbent.

In another embodiment, a composite is provided comprising (a) plasmonic nanoparticle having (i) a magnetic core of iron carbide or metallic iron of a zero oxidation state, the diameter of the magnetic core being from about 5 nm to about 100 nm; (ii) a protective carbon shell encapsulating the magnetic core, the thickness of the protective carbon shell being from about 1 nm to about 100 micron; and (iii) a luminescent amorphous carbon nitride coating encapsulating the carbon shell, the carbon nitride coating being attached to the carbon shell by an alkyl carboxylic acid wherein the thickness of the amorphous carbon nitride coating is from about 1 nm to about 1 micron; (b) a porous adsorbent, the nanoparticle being adsorbed and immobilized into the pores of the porous adsorbent; and (c) a polymeric coating encompassing the adsorbent.

In another embodiment, a process of preparing a spherical nanoparticle is provided. The spherical nanoparticle has a magnetic core of iron, nickel or cobalt or an alloy thereof, a carbon shell encapsulating the magnetic core, at least one organic functional group on the surface of the carbon shell attached through covalent bonding, and a coating of amorphous carbon nitride encapsulating the functionalized carbon shell through chemical reaction. The spherical nanoparticle is prepared by attaching at least one functional group onto the carbon shell encapsulating the magnetic core to render a functionalized carbon encapsulated core. Cyanuric chloride and lithium nitride are then reacted in the presence of the functionalized carbon encapsulated core to form carbon nitride. The carbon nitride then encompasses the carbon shell.

In another embodiment, a process of preparing a nanoparticle is provided, the nanoparticle having a magnetic core of iron carbide or metallic iron of zero oxidation, a carbon shell encapsulating the magnetic core (wherein the carbon shell is diamond-like, graphene or graphene oxide), and carbon nitride encapsulating the carbon shell wherein the carbon nitride is attached to the carbon shell by at least one functional group. The spherical nanoparticle is prepared by attaching at least one functional group onto the carbon shell encapsulating the magnetic core to render a functionalized carbon encapsulated core. Cyanuric chloride and lithium nitride are then reacted in the presence of the functionalized carbon encapsulated core to form carbon nitride. The carbon nitride then encompasses the carbon shell.

In another embodiment, a process of preparing a plasmonic nanoparticle is provided. The plasmonic nanoparticle has a magnetic core of iron carbide or metallic iron of a zero oxidation state, the diameter of the magnetic core being from about 5 nm to about 100 nm; a protective carbon shell encapsulating the magnetic core, the thickness of the protective carbon shell being from about 1 nm to about 1 micron; and a luminescent amorphous carbon nitride coating encapsulating the carbon shell, the carbon nitride coating being attached to the carbon shell by an alkyl carboxylic acid wherein the thickness of the amorphous carbon nitride coating is from about 1 nm to about 1 micron. The plasmonic nanoparticle is prepared by attaching at least one functional group onto the carbon shell encapsulating the magnetic core to render a functionalized carbon encapsulated core. Cyanuric chloride and lithium nitride are then reacted in the presence of the functionalized carbon encapsulated core to form carbon nitride. The carbon nitride then encompasses the carbon shell.

In another embodiment, a process of preparing a spherical nanoparticle having an exterior coating of carbon nitride is provided. The spherical nanoparticle has a magnetic core of iron, nickel or cobalt or an alloy thereof, a carbon shell encapsulating the magnetic core, at least one organic functional group on the surface of the carbon shell through covalent bonding, and a coating of amorphous carbon nitride encapsulating the functionalized carbon shell through chemical reaction. In the process, a magnetic core is encapsulated with a carbon shell, the thickness of the carbon shell being between from about 1 nm to about 100 nm. A functional group is attached onto the carbon shell to provide a functionalized carbon encapsulated core. Cyanuric chloride and lithium nitride are then reacted in the presence of the functionalized carbon encapsulated core.

In another embodiment, a process of preparing a nanoparticle is provided, the nanoparticle having a magnetic core of iron carbide or metallic iron of zero oxidation, a carbon shell encapsulating the magnetic core (wherein the carbon shell is diamond-like, graphene or graphene oxide), and carbon nitride encapsulating the carbon shell wherein the carbon nitride is attached to the carbon shell by at least one functional group. In the process, the magnetic core is encapsulated with a carbon shell, the thickness of the carbon shell being between from about 1 nm to about 100 nm. A functional group is attached onto the carbon shell to provide a functionalized carbon encapsulated core. Cyanuric chloride and lithium nitride are then reacted in the presence of the functionalized carbon encapsulated core.

In another embodiment, a process of preparing a plasmonic nanoparticle is provided. The plasmonic nanoparticle has a magnetic core of iron carbide or metallic iron of a zero oxidation state, the diameter of the magnetic core being from about 5 nm to about 100 nm; a protective carbon shell encapsulating the magnetic core, the thickness of the protective carbon shell being from about 1 nm to about 1 micron; and a luminescent amorphous carbon nitride coating encapsulating the carbon shell, the carbon nitride coating being attached to the carbon shell by an alkyl carboxylic acid wherein the thickness of the amorphous carbon nitride coating is from about 1 nm to about 1 micron. The plasmonic nanoparticle is prepared by encapsulating the magnetic core with a carbon shell, the thickness of the carbon shell being between from about 1 nm to about 100 nm. A functional group is attached onto the carbon shell to provide a functionalized carbon encapsulated core. Cyanuric chloride and lithium nitride are then reacted in the presence of the functionalized carbon encapsulated core.

In another embodiment, a process of preparing a fluorescent, plasmonic and magnetic nanoparticle is provided. The spherical nanoparticle has a magnetic core of iron, nickel or cobalt or an alloy thereof, a carbon shell encapsulating the magnetic core, at least one organic functional group on the surface of the carbon shell through covalent bonding, and a coating of amorphous carbon nitride encapsulating the functionalized carbon shell through chemical reaction. The nanoparticle is prepared by coating the carbon shell onto the magnetic material and encompassing the magnetic material with the carbon shell, the thickness of the carbon shell being between from about 1 nm to about 1 micron, the magnetic material being iron carbide or iron having a zero oxidation state. At least one function group is attached onto the carbon shell. Cyanuric chloride and lithium nitride are then reacted in the presence of the carbon shell coated magnetic material. The amorphous carbon nitride being formed becomes attached onto the functional group.

In another embodiment, a process of preparing a fluorescent, plasmonic and magnetic nanoparticle is provided, the nanoparticle having a magnetic core of iron carbide or metallic iron of zero oxidation, a carbon shell encapsulating the magnetic core (wherein the carbon shell is diamond-like, graphene or graphene oxide), and carbon nitride encapsulating the carbon shell wherein the carbon nitride is attached to the carbon shell by at least one functional group. In the process, the magnetic core is encapsulated with a carbon shell, the thickness of the carbon shell being between from about 1 nm to about 100 nm. A functional group is attached onto the carbon shell to provide a functionalized carbon encapsulated core. Cyanuric chloride and lithium nitride are then reacted in the presence of the functionalized carbon encapsulated core.

In another embodiment, a process of preparing a fluorescent, plasmonic and magnetic nanoparticle is provided. The plasmonic nanoparticle has a magnetic core of iron carbide or metallic iron of a zero oxidation state, the diameter of the magnetic core being from about 5 nm to about 100 nm; a protective carbon shell encapsulating the magnetic core, the thickness of the protective carbon shell being from about 1 nm to about 1 micron; and a luminescent amorphous carbon nitride coating encapsulating the carbon shell, the carbon nitride coating being attached to the carbon shell by an alkyl carboxylic acid wherein the thickness of the amorphous carbon nitride coating is from about 1 nm to about 1 micron. The fluorescent, plasmonic and magnetic nanoparticle is prepared by encapsulating the magnetic core with a carbon shell, the thickness of the carbon shell being between from about 1 nm to about 100 nm. A functional group is attached onto the carbon shell to provide a functionalized carbon encapsulated core. Cyanuric chloride and lithium nitride are then reacted in the presence of the functionalized carbon encapsulated core.

In another embodiment, a method of treating a well or a subterranean formation penetrated by the well is provided by introducing into the well any of the composites referenced herein. The polymeric coating is degraded or solubilized within the well. The nanoparticle is then released from the adsorbent into the fluid. The fluid containing the nanoparticle is then recovered from the well.

In another embodiment, a method of fracturing a subterranean formation penetrated by a well is provided. In this embodiment, a fracturing fluid is pumped into the well at a pressure sufficient to enlarge or create a fracture in the formation. The fracturing fluid containing any of the composites referenced herein. The polymer coating which encompasses the adsorbent is slowly solubilized. The nanoparticle is then released into a fluid within the well. The nanoparticle is concentrated at the surface of the well by subjecting the fluid to a magnetic field. A sample containing the concentrated nanoparticle is then subjected to luminescence spectroscopy analysis.

In another embodiment, a method of enhancing the productivity of hydrocarbon containing fluids from a subterranean formation penetrated by a well is provided. In this embodiment, a fluid comprising any of the composites referenced herein is pumped into the well. The composite in fluids produced from the well is identified by qualitatively and/or quantitatively measuring the amount of functional group in the fluid by luminescence spectroscopy.

In another embodiment, a method of fracturing multiple zones of a subterranean formation penetrated by a well is provided. In this embodiment, a fracturing fluid is pumped into each zone of the formation to be fractured. The fracturing fluid pumped into each of the zones comprises any of the nanoparticles referenced herein. The functional groups on the nanoparticles introduced into each of the zones is qualitatively and quantitatively distinguishable from each other. A fracture is enlarged or created in the formation. Fluids recovered from at least one of the multiple zones is recovered. The zone within the subterranean formation from which the recovered fluid is identified by identifying the functional group of the nanoparticles in the recovered fluid.

In another embodiment, a method of monitoring the production of fluids produced in multiple productive zones of a subterranean formation penetrated by a well is provided. In this method, a fracturing fluid is pumped into the multiple productive zones at a pressure sufficient to enlarge or create fractures in each of the multiple productive zones. The fracturing fluid comprises any of the nanoparticles referenced herein. The nanoparticles pumped into each zone contain a qualitatively and/or quantitatively distinguishable functional group. The amount of fluids produced from at least one of the multiple productive zones is monitored from the functional groups in the produced fluid In another embodiment, a method for determining water breakthrough in a production well associated with one or more injector wells is provided. In this method, an aqueous fluid having any of the nanoparticles referenced above is injected into one or more of the injection wells. The aqueous fluid then flows from the injector well into the production well. Water breakthrough in the production well is qualitatively determining the presence or quantitatively measuring the amount of the functional groups in the produced fluid.

In another embodiment, a method of increasing hydrocarbon production from a production well penetrating a hydrocarbon-bearing reservoir is provided. More than one injection well is associated with the production well. Aqueous fluids having a water soluble nanoparticle are injected into the injector wells. The aqueous fluids contain any of the nanoparticles referenced herein. Pressure in the hydrocarbon-bearing reservoir is maintained above the bubble point of the hydrocarbons in the reservoir. The aqueous fluids pumped into each of the injection wells contains qualitatively distinguishable functional groups on the surface of the carbon shell. The injector well into which breakthrough water was injected is determined, upon water breakthrough in the production well, by qualitatively determining the presence of the functional groups in the recovered hydrocarbons. The identified injector well may then be shut off.

Accordingly, the present disclosure includes features and advantages which are believed to enable it to advance downhole tool technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 11a shows the survey XPS spectrum of functionalized (a) Fe@C and (b) CNx coated Fe@C while

DETAILED DESCRIPTION OF THE PREFERRED EMBODIMENTS

Figure 1:
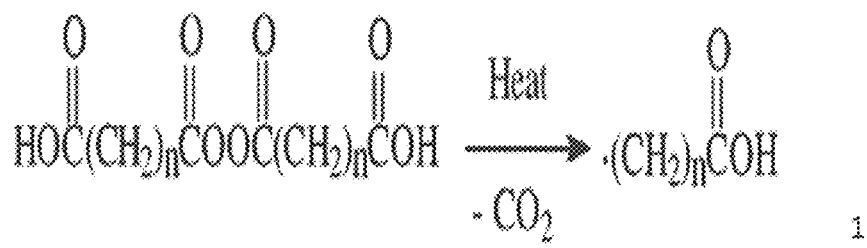
FIG. 1 depicts the process of preparing representative nanoparticles, as defined herein.
Figure 1:
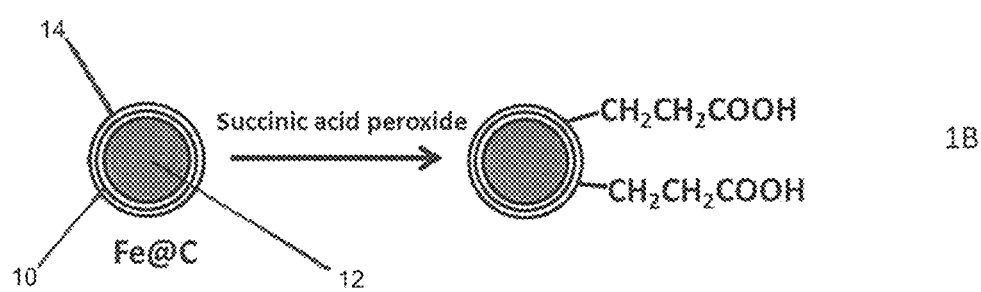
Figure 1:
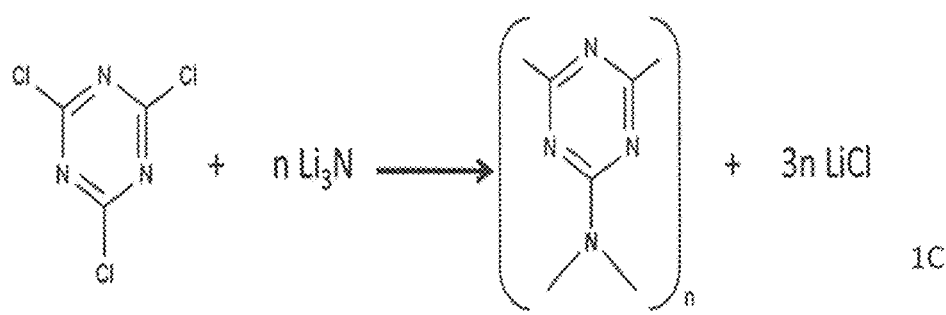
Figure 1:
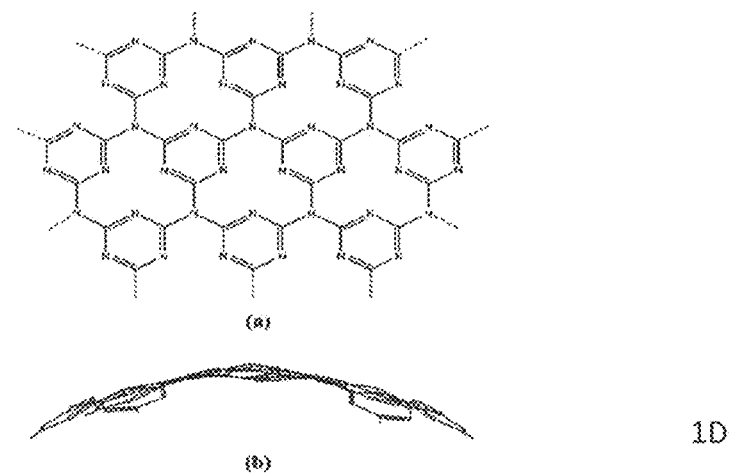

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another.

The magnetic nanoparticles defined herein have utility in the enhancement of oil and/or gas recovery from subterranean reservoirs. As used herein, the term "nanoparticle" means and includes any particle having an average particle size of about 1,000 nm or less.

The nanoparticles may be characterized as having a magnetic core, a carbon shell which encapsulates the magnetic core, one or more functional groups on the surface of the carbon shell and an external coating of carbon nitride. The carbon nitride is attached to the carbon shell through one or more of the functional groups.

The nanoparticles, in an embodiment, have a number averaged particle size of less than or equal to 200 nm. In another embodiment, the particles are microparticles of about 1 to about 1,000 µm, or about 1 to about 100 µm. In a specific embodiment, the nanoparticles are sub-micron of about 250 nm to less than about 1,000 nm. In another embodiment, the nanoparticles are about 1 to about 250 nm, or about 5 to about 100 nm. Generally, as used herein, "particle size" refers to the number averaged particle size along the longest particle dimension, and can be determined using particle size measurement methods known in the art, such as laser light scattering (static or dynamic light scattering), or direct determination methods such as scanning electron microscopy (SEM) or transmission electron microscopy (TEM).

Typically, the nanoparticles referenced herein are spherical in shape, having diameters ranging from about 5 nm to about 200 nm, more typically from about 10 nm to about 50 nm. The nanoparticles may be separated into narrower size ranges by suitable methods, which may include dialysis. For example, the nanoparticles may be passed through at least one membrane having a pore size corresponding to a desired size of the nanoparticles. Nanoparticles having different sizes may exhibit different optical properties. For instance, separated nanoparticles may have a diameter ranging from between about 5 nm and about 10 nm, between about 10 nm and about 20 nm, or between about 20 nm and about 40 nm. Nanoparticles having different sizes may exhibit different optical properties.

The magnetic core of the nanoparticles exhibits superparamagnetic properties. In a preferred embodiment, the magnetic core is iron, nickel or cobalt or an alloy thereof. Especially preferred as the magnetic core are iron carbide and metallic iron (of zero oxidation state).

In another embodiment, the core is a magnetic metal oxide, such as $Fe_3O_4$ or a oxyhydroxide, such as FeCOOH, which can be coated with carbon through a chemical vapor deposition (CVD) process The coated carbon layer may then be functionalized.

In another embodiment, the core may be a magnetic metal oxide or an oxyhydroxide which may be converted to the metallic magnetic core in the presence of a reducing gas, such as hydrogen or argon, at elevated temperatures as high as 1500° C. The reduction process will render a magnetic core having a different magnetic moment than the core of the metal at a zero oxidation state.

The carbon shell which encapsulates the magnetic core acts as a protective coating for the magnetic core. As such, the magnetic core is protected from adverse downhole conditions. In addition, the magnetic core is unaffected by well treatment fluids by the presence of the protective coating. Thus, stabilization of the magnetic core is preserved under downhole conditions. For example, the magnetic core is not sensitive to any change in pH conditions downhole.

The thickness of the protective carbon shell is typically from about 1 nm to about 100 nm. As used herein, Fe@C shall refer to particle having a carbonaceous coating on the magnetic core. While the core is typically iron, the core denoted by Fe@C may or may not be iron based.

In a preferred embodiment, the carbon shell exhibits a $sp^2$ only or $sp^2$ and $sp^3$ carbon structure.

The carbonaceous particle has, in an embodiment, a number averaged particle size of less than or equal to 200 nm. In another embodiment, the carbonaceous particle is a microparticle of about 1 to about 1,000 micrometers, or about 1 to about 100 micrometers. In another embodiment, the carbonaceous particle is a nanoparticle having a number average particle size of less than about 200 nanometer. In a specific embodiment, the carbonaceous particle is a submicron particle of about 250 nm to less than about 1,000 nm. In another embodiment, the carbonaceous particle is a nanoparticle of about 1 to about 200 nm, or about 1 to about 100 nm. Generally, as used herein, "particle size" refers to the number averaged particle size along the longest particle dimension, and can be determined using particle size measurement methods known in the art, such as laser light scattering (static or dynamic light scattering), or direct determination methods such as scanning electron microscopy (SEM), atomic force microscopy (AFM) or transmission electron microscopy (TEM).

Suitable carbon shells include graphitic carbon, graphene, graphene oxide or diamond-like carbon.

Graphitic carbon includes amorphous carbon as well as ordered graphitic regions such as carbon onions (concentric graphene spherical shells). Graphitic carbons include nanographite, a stacked structure of two or more layers of graphite having a plate-like two dimensional structure of fused hexagonal rings with an extended delocalized pi-electron system, layered and weakly bonded to one another through pi-pi stacking interaction.

Graphene may be a single sheet or several sheets of graphite having nano-scale dimensions, such as an average particle size of (average largest dimension) of less than e.g., 500 nanometers (nm), or in other embodiments may have an average largest dimension greater than 1 μm.

Graphene oxide includes those compounds of carbon, hydrogen and oxygen in various ratios, obtained by treating graphite with strong oxidizers. They are often envisioned as a sheet with carbon atoms arranged in a hexagonal, planar pattern having hydroxyl groups (—OH) and carboxyl groups (—COOH) at some sites along the edges of the sheet, and hydroxyl groups and epoxy groups (—O—) at some sites of the sheet interior.

The carbon shell may surround the magnetic core and may be attached to the core by covalent bonds. The amorphous carbon region may include sites of unsaturation (e.g., double bonds) that react under conditions of functionalization to form functional groups. This is especially characteristic when the carbon shell is composed of carbon onions.

Diamond-like carbon (DLC) is an amorphous carbon formulated to have some properties similar to the properties of diamond, such as hardness or chemical stability. DLC contains $sp^3$ hybridized carbon atoms that may be arranged in any combination of cubic and hexagonal lattices. For example, DLC may include tetrahedral amorphous carbon, or ta-C, which consists of only $sp^3$ carbon.

The carbonaceous source may be attached to the magnetic core by deposition such as chemical vapor deposition (CVD), physical vapor deposition (PVD), pyrolysis or by casting a slurry of the carbon onto the surface of the magnetic core, followed by heating and/or pressurizing such as by a standard high temperature/high pressure (HTHP) process. Alternatively, combinations of such processes may be used.

In most embodiments, the carbonaceous source adds to the surface of the nucleus of the magnetic core and builds to form a uniform spherical shape, a spheroidal shape, a worm-like carbon structure, a nanofiber shape, a nano- and/or micro-coil shape, or a combination comprising at least one of the foregoing. However, as previously stated, the nanoparticle is typically spherical in shape.

The carbon shell is derivatized to introduce chemical functionality to its surface. It is the chemical functionality on the carbon shell which interacts with carbon nitride.

For example, the carbon shell may be derivatized by the addition, onto its surface, of a carboxy (e.g., carboxylic acid groups), epoxy, ether, ketone, sulfonate, sulfate, sulfosuccinate, thiosulfate, succinate, carboxylate, hydroxyl, glucoside, alkyl, aryl, aralkyl, alkaryl, alloy (including ethoxylate, propoxylate, etc.), phosphate, lactone, amine, amide, imido, ionic groups such as ammonium groups and/or carboxylate salt groups or a combination thereof.

In an embodiment, the carbon shell of the nanoparticle is functionalized with at least one organic functional group selected from —SH, —$NH_2$, —NHCO, —OH, —COOH, —F, —Br, —Cl, —I, CN, SCN, O—Si—R, —H, —R—NH, —R—, —R—S, —COP, —COCl and —SCl.

In a preferred embodiment, the functional group is a carboxylic, carboxylate, amino, hydroxyl, alkyl or a maleinimido and is most preferably an alkyl carboxylic acid, most preferably a $C_2$-$C_{10}$ carboxylic acid.

The nanoparticles may be considered to be "hybrid nanoparticles" since they may exhibit multiple functionalities by the attachment of more than one functional group on the surface of the carbon shell. The different functional groups typically exhibit different chemical and physical properties by detection means like luminescence, such as fluorescence, and magnetism. Thus, when two different functional groups are attached to the carbon surface, the two functional groups are qualitatively detectable from each other. For instance, they may have at least two functional groups which are luminescent at distinct wavelengths.

Derivatization of the carbon shell further increases dispersibility and interaction of the nanoparticles with a surrounding matrix (such as an aqueous slurry). Thus, derivatization improves suspension in the matrix and uniform particle distribution in the matrix.

The nanoparticles may be monodispersed or polydispersed in particle size distribution. In this way, combinations of monodisperse particles, of two or more different sizes and particle size distributions, can be used to form different distributions of particles. Different particle size distributions can be used to provide improved mechanical strength and friction resistance.

The functional group which is attached onto the carbon shell is preferably an organic functional group and is preferably attached onto the shell through covalent bonding.

In an embodiment, the functional groups may be introduced onto the carbon shell by derivatizing the unsaturated functionality associated with the carbon onion regions of a nanoparticle. This may be affected by any of numerous known methods for direct carbon-carbon bond formation to a double bond, or by linking to a functional group derived from an olefin. Exemplary methods of functionalizing may include, but are not limited to, reactions such as oxidation or oxidative cleavage of double bonds to form alcohols, diols, or carbonyl groups including aldehydes, ketones, or carboxylic acids; diazotization of double bonds proceeding by the Sandmeyer reaction.

In a preferred embodiment, the functional groups are added to the carbon shell under mild conditions. Typically, the functional group is attached to the carbon shell by covalent bonding. The carbon shell may be derivatized by the free radical addition of functional groups, such as the free radical addition of an alkyl group terminated with a carboxylic acid. As illustrated in FIG. 1a, this method may use the organic acyl peroxides of dicarboxylic acids, such as HOOC(CH$_2$)$_n$ C(O)OO(O)C—(CH$_2$)$_n$COOH where n is either 2 or 3, as precursor for the corresponding functional radical. Organic peroxides are preferred since they offer more kinds of functional groups. Acyl peroxides, RC(O)OO(O)CR, where R is aliphatic (preferably a $C_1$-$C_6$ aliphatic), aromatic (preferably a $C_6$-$C_{10}$ aromatic) or another group, readily decompose to release carbon dioxide and form free radicals R upon mild heating. Succinic acid peroxide, wherein n is 2, decomposes to form a HOOCCH$_2$CH$_2$COO$^-$ radical, which can subsequently lose $CO_2$ to yield a 2-carboxyethyl radical. Glutaric acid peroxide, where n is 3, provides 3-carboxypropyl radical via a similar route. As illustrated in FIG. 1b, the succinic acid peroxide is illustrated as reacting with the Fe@C 10 having magnetic core 12 and coating 14 to form free carboxylic acid groups attached to the Fe@C. For a discussion of Fe@C, see "The Synthesis of Carbon Coated Fe, Co and Ni nanoparticles and an Examination of Their Magnetic Properties", Carbon, Vol. 47, Issue 12, 2009, pp. 2821-2828; "The Morphological and Magnetic Properties of Superparamagnetic Carbon-coated Fe Nanoparticles Produced by Arc Discharge", Journal of Nanoscience and Nanotechnology, 10(4), 2010, pp. 2646-2649; "CCVD Synthesis of Carbon-encapsulated Cobalt Nanoparticles", Advanced Functional Materials, 21 (18), 2011, pp. 3583-3588; "Laser Synthesis of Magnetic Iron-carbon Nanocomposites With Size Dependent Properties, Advanced Powder Technology, Vol. 23, Issue 1, January 2012, pp. 88-96; and "Continuous Synthesis of Controlled Size Carbon-encapsulated Iron Nanoparticles, Materials Research Bulletin, Vol. 46, Issue 12, December 2011, Pages 2408-2417.

In an exemplary reaction, a large excess of the peroxide acid precursor to the carbon shell (typically about 10:1 weight ratio) is used in order to facilitate the addition reaction. The reaction is typically conducted under mild heat, typically between from about 80 to about 100° C.

Attachment of different functional groups (such as amino, hydroxyl, alkyne, or maleinimido groups) to Fe@C nanoparticles may also proceed through reaction with an aryl diazonium salt. In Journal Nanopart Research, 17:379 (2015), a two step process is provided for forming reaction of aryl diazonium salt onto a carbon shell and then further linkage through a sulfonamide moiety. Such functionalization processes however are generally not as favorable since they are known to lead to oxidation of the magnetic core, especially when the magnetic core is iron.

The exterior carbon nitride coating of the magnetic nanoparticle exhibits higher quantum yield then graphitic carbon nitride. The carbon nitride which forms the exterior of the nanoparticle is typically an amorphous carbon nitride. It typically attaches to the carbon shell by reacting with the one or more functional groups attached to the carbon shell. The attachment of carbon nitride to the functional group is believed to occur by a chemical reaction. The coating of carbon nitride on the carbon shell is typically from about 1 nm to about 1 micron.

The carbon nitride may be coated onto the carbon shell by numerous methods. For instance, carbon nitride has been known to be synthesized through thermal decomposition of melamine and hydrothermal processes. However, it has been proven to be difficult to control the morphology and the nanostructure of the nanoparticles.

In a preferred embodiment, amorphous carbon nitride is synthesized by reacting cyanuric chloride and lithium nitride in the presence of the functionalized Fe@C. The resulting product, a powder of $C_3N_4$ stoichiometry, then attaches onto the functional group(s) on the carbon coating the magnetic core. FIG. 1c illustrates the synthesis of the carbon nitride using cyanuric chloride (or cyanuric fluoride) as a six-membered triazine building block and lithium nitride, $Li_3N$, as the nitrogen-bridging agent. The resulting carbon nitride is illustrated as having a spherical structure. The solid state synthesis of the carbon nitride typically results from the reaction of the cyanuric chloride and lithium nitride, in the presence of Fe@C, at a temperature from 50° C. to 175° C. in an organic solvent. Preferred organic solvents are diglyme. The synthesized powder demonstrates featureless morphology with grain particle sizes exceeding 100 nm. The powder, as it is synthesized, attaches onto the carbon shell (as a substrate) through the functional group(s), illustrated in FIG. 1d. When dried, the resulting nanoparticles exhibit a closed spherical structure having an exterior coating of carbon nitride.

Any of the nanoparticles referenced herein may be suitable for the methods disclosed herein, especially those relating to the use of the nanoparticles in hydraulic fracturing including multi-zone fracturing, enhanced oil recovery, flooding, etc.

The nanoparticles may exhibit hydrophobicity, hydrophilicity or both hydrophobicity and hydrophilicity by the presence of the organic functional group(s) attached to the carbon shell. For instance, where the functional group attached to the carbon shell is hydrophobic, the nanoparticles may exhibit hydrophobicity where not all of the functional group are interacted with the carbon nitride coating. Where multiple functional groups are attached to the carbon shell, some of which are hydrophobic, some of which are hydrophilic and some of which are oleophilic, the nanoparticles may impart both a hydrophobic character and a hydrophilic character and/or an oleophilic character to the spherical particulate. Thus, in an embodiment, multiple distinct functional groups are attached to the carbon shell. Some of these functional groups may be hydrophilic and other functional groups are not hydrophilic; some of these functional groups may be hydrophobic and other functional groups are not hydrophobic; some of these functional groups may be oleophilic and the others are not oleophilic.

Thus, in an embodiment, some of the functional groups on the carbon shell are exposed hydroxyl groups, exposed carboxyl groups, exposed ether groups and combinations thereof. Thus, in some embodiments, exposed surfaces of the nanoparticles may contain functionalized hydrophilic functional groups, hydrophobic and/or oleophilic functional groups. Non-limiting examples of hydrophilic groups include, for example, a hydroxyl group, a carboxyl group, an amine group, a thiol group, an ether group and a phosphate group. Non-limiting examples of hydrophobic groups include, for example, an alkyl group, an alkenyl group, an alkynyl group, and an aryl group.

The nanoparticles described here are dye-free and may be stable at elevated temperatures (e.g., up to about 400° C.) and a wide range of pH (e.g., a pH between about 0 and about 14.0). Emission spectra of the nanoparticles may be dependent upon the size and composition of the nanoparticles.

The nanoparticles disclosed herein further support surface plasmons (oscillations of the conduction electrons at the surface of the nanoparticles). The basis for the effect is the plasmonic resonance of the free electrons in the metallic core of the nanoparticle. Such resonant electromagnetic behavior is the result of confinement of the conduction electrons to the small metal nanoparticle volume where dimensions are much smaller than the wavelength of an excitation electromagnetic wave. Such resonance provides the conduction electrons on the metal nanoparticle surface great ease to undergo charge distribution and form partial dipoles. By providing large localized field enhancements, the nanoparticles exhibit extraordinary optical properties.

The nanoparticles may be formulated to interact with surfaces of the subterranean formation. They may be formulated into well treatment fluids in aqueous based as well as solvent based fluids.

Further, the nanoparticles (especially by being rendered hydrophilic, hydrophobic and/or oleophilic by one or more functional groups) may be used in a wide range of well treatment operations. For instance, hydrophilic groups on surfaces of the nanoparticles may interact with water wet surfaces of the subterranean formation; hydrophobic groups may interact with oil wet surfaces of the subterranean formation.

In some embodiments, a mixture of nanoparticles may be introduced into a well treatment fluid. Typically, the nanoparticles are used as tracers. When used as a tracer, the nanoparticles are typically soluble in either hydrocarbons or water. In an embodiment, however, a combination of oil soluble and water soluble tracers may be simultaneously used.

The nanoparticles are typically qualitatively distinguishable from each other. Since the nanoparticles are distinguishable by luminescent properties, it is also possible to use different nanoparticles for quantitative purposes. For instance, a ratio of formation surfaces that are water wet relative to formation surfaces that are oil wet may correspond to a proportion of hydrophilic nanoparticles to hydrophobic nanoparticles in the produced fluid. Information about the wettability of the formation surfaces may be particularly useful where stimulation methods include expensive fluids, such as those including surfactants, micellar fluids, or polymers. Where the formation includes more water wet surfaces than oil wet surfaces, an aqueous-based stimulation fluid may be used during further stimulation procedures. Where the formation includes more oil wet surfaces than water wet surfaces, a non-polar stimulation fluid may be used during further stimulation procedures.

In other embodiments, two or more well treatment fluids may be used. Different nanoparticles which are qualitatively distinguishable may be used in the two or more fluids. For instance, hydrophilic nanoparticles exhibiting different optical properties may be used in different fluids.

In some embodiments, the nanoparticles may be introduced into the subterranean formation during stimulation processes. Stimulation processes such as, for example, hydraulic fracturing (i.e., "fracking") may be used to enhance hydrocarbon recovery from a hydrocarbon-bearing subterranean formation. In hydraulic fracturing operations, hydraulic fractures may be created or enlarged by injecting a fluid containing additives and including a suspended proppant material (e.g., sand, ceramics, etc.) into a targeted subterranean formation under elevated pressure conditions sufficient to cause the hydrocarbon-bearing formation material to fracture. The nanoparticles may be included in the fracturing fluid.

In addition to determining a chemical or physical parameter of the formation fluid (such as pH), it may be desirable to determine a location (e.g., a zone) from which produced fluids (e.g., hydrocarbons, water, etc.) originate. Nanoparticles exhibiting different optical properties may be introduced into various zones of the subterranean formation. In some embodiments, between about one and about twenty different types of nanoparticles, each exhibiting one or more different optical properties than the other types of nanoparticles, may be introduced into one or more different zones of the subterranean formation.

As another example, nanoparticles may be introduced proximate to an aquifer zone. Produced fluids may be analyzed to determine if the produced fluids include an optical property of the nanoparticles introduced into the aquifer zone. Identification of the corresponding optical property may be an indication that the produced fluid includes water from the aquifer zone.

In some embodiments, the nanoparticles may be used to identify a source of fluids produced from a production well. Nanoparticles introduced into each zone of the subterranean formation may exhibit a different optical property than nanoparticles introduced into other zones of the subterranean formation. In particular, by way of non-limiting example, the nanoparticles may be dispersed in produced fluids to indicate the source of the hydrocarbons. The optical property, such as fluorescence, of the nanoparticles in the hydrocarbons may be an indication of the source of the hydrocarbons.

A mixture of hydrophilic and hydrophobic nanoparticles may be introduced into the subterranean formation by pumping the mixture of nanoparticles into the well penetrating the formation. A produced fluid may include at least one of the hydrophilic nanoparticles and the hydrophobic nanoparticles. The nanoparticles may be concentrated at the surface by subjecting the fluid to a magnetic field. The collected sample containing concentrated nanoparticles may then be analyzed, such as by fluorescence spectroscopy.

The proportion of hydrophilic nanoparticles to hydrophobic nanoparticles may be determined by, for example, comparing the fluorescence intensity at the peak emission wavelength of the hydrophilic nanoparticles to the fluorescence intensity at the peak emission wavelength of the hydrophobic nanoparticles.

Thus, in some embodiments, nanoparticles exhibiting different optical properties may be introduced into multiple zones of the subterranean formation. (The term "zone" as used herein may refer to separate formations within a well or separate areas within a single formation within the well.) The nanoparticles introduced in one zone may be different from the nanoparticles introduced into another zone being treated. The nanoparticles introduced into different zones are preferably qualitatively (and preferably also quantitatively) distinguishable in order to identify the zone or area within the formation from which a produced fluid originates. As such, the nanoparticles introduced into each of the zones being treated preferably exhibit unique absorption and optical properties such that the properties of nanoparticles introduced into one zone is unable to mask the properties of nanoparticles introduced into another zone.

Detection of an optical property in a produced fluid corresponding to an optical property of nanoparticles disposed in a zone of the subterranean formation may be an indication that the produced fluid originated from the corresponding zone. Detection of optical properties in the produced fluid that correspond to nanoparticles introduced into different zones may be an indication that the produced fluid comprises formation fluid originating from each of the corresponding zones.

Thus, for instance, a first fluid having fluorescent nanoparticles may be introduced into a first zone of a formation. A second fluid having qualitatively distinguishable nanoparticles from the fluid introduced into the first zone) may be introduced into a second zone of a formation. A proportion of formation fluid originating from each zone may be determined by, for example, the relative value or intensity of the corresponding measured optical property in the formation fluid. (It is understood that the terms "first" and "second" need not be sequential and only denote the order of addition of the fluids into the formation or the order of addition of zones treated in a formation. In other words, the first zone is merely penultimate to the second zone. Thus, for example, the "first zone" may refer to a third zone of a multi-zone formation and the "second zone" may refer to a sixth zone of a multi-zone formation; the "first treatment fluid" may be a fourth treatment fluid introduced while the "second treatment fluid" may be the eighth treatment fluid introduced.) For example, nanoparticles introduced into a first zone with a first fracturing fluid may be formulated to fluoresce at wavelengths that correspond to blue light (e.g., at wavelengths of about 450 nm) and nanoparticles introduced into a second zone with a second fracturing fluid may be formulated to fluoresce at wavelengths that correspond to red light (e.g., at wavelengths of about 700 nm). An emission spectrum (e.g., a fluorescence color) of produced fluid may indicate whether the produced fluid originated from the first zone or the second zone.

In addition to monitoring different zones in hydrocarbon production wells and determining the zone in which hydrocarbons have been produced from the formation, the nanoparticles may also be used to monitor oil and gas for flow assurance and for maintaining regulatory compliance. The ability to analyze the fluids on-site, quickly and frequently, further assists operators to detect flow assurance, asset integrity and process problems early enabling them to take preventative action to minimize the risks of production loss and to adapt the treatment operation.

Further, the nanoparticles may also be used to determine sites of flowback water and produced water as well as for detection or early warning of phenomena such as water breakthrough.

In addition to their use in hydraulic fracturing, the nanoparticles may be included in fluids used in well treating applications near wellbore and may be directed toward improving wellbore productivity and/or controlling the production of formation sand. Particular examples include gravel packing and "frac-packs." Typical gravel packing and frac packing methods.

In gravel packing, sand is used to pre-pack a screen to prevent the passage of formation particles or unconsolidated materials from the formation into the wellbore during production of fluids from the formation. Gravel packing is essentially a technique for building a two-stage filter downhole. The filter consists of gravel pack sand and a screen or liner. The gravel pack sand is sized according to the particle size distribution of the unconsolidated materials. The screen or liner has openings that are sized to retain the gravel pack sand. Thus the gravel pack particulates retain the unconsolidated formation materials and the screen or liner retains the gravel pack particulates. The gravel pack particulates and the screen or liner act together to reduce or eliminate the production of the unconsolidated formation materials with the oil or gas production. A slurry of sand introduced into the well further may contain the nanoparticles. The slurry is then pumped into the workstring within the well until the slurry is within about 150 to about 300 feet of the primary port. Positioning of a crossover service tool allows the slurry to travel into the screen/casing annulus. Particulates are retained by the screen or liner and the remaining fluid leaks off into the formation allowing a tightly packed sand filter to remain in place. Monitoring the nanoparticles provides information of the type and amount of the produced fluid from the formation.

The nanoparticles may further be used in a frac pack operation where the unconsolidated formation is hydraulically fractured while a two-stage filter of gravel pack is simultaneously built. In frac packing, the processes of hydraulic fracturing and gravel packing are combined into a single treatment to provide stimulated production and an annular gravel pack to reduce formation sand production.

Further, nanoparticles may be used in combination with an acid in an acid fracturing operation. Since the nanoparticles are not pH sensitive, they may be mixed with acids for acid fracturing operations. The acid is a corrosive, very low pH acid which reacts with the surrounding formation. The method is particularly effective with sandstone and carbonate formations. Acids such as hydrochloric acid, formic acid, and acetic acid are injected at high rates and pressures into the formation with the fluid to intentionally cause the formation to fail by inducing a fracture in the subterranean rock. In another embodiment, the fluid of the invention may contain the acid. Fractures, originating adjacent to the wellbore, initiate as two wings growing away from the wellbore in opposite directions. The acid is used to dissolve or etch channels or grooves along the fracture face so that after pressure is relieved and the fracture heals, there continues to exist non-uniform highly conductive channels, allowing unrestrained hydrocarbon flow from the reservoir to the wellbore. In contrast, with propped fracturing, fracture conductivity is maintained by propping open the created fracture with a solid material, such as sand, bauxite, ceramic, and certain lighter weight materials. Conductivity in acid fracturing is obtained by etching of the fracture faces with an etching acid instead of by using proppants to prevent the fracture from closing. Monitoring of the nanoparticles provides information of the type and amount of the produced fluid from the formation and the success of the acid fracturing operation.

Nanoparticles may further be used, in addition to acid fracturing, in matrix acidizing. In matrix acidizing, a fluid containing an organic or inorganic acid or acid-forming material is injected into the formation below fracture pressure such that the acid or acid-forming material reacts with minerals in the formation. A channel or wormholes is created within the formation. As subsequent fluid is pumped into the formation, it tends to flow along the channel, leaving the rest of the formation untreated. Matrix acidizing is often used to enhance near-wellbore permeability. In addition to enhancing the production of hydrocarbons, blockages caused by natural or man-made conditions may further be removed during matrix acidizing. For instance, formation damage caused by drilling mud invasion and clay migration may also be removed during the process. The use of matrix acidizing is often preferred in the treatment of carbonate formations since the reaction products are soluble in the spent acid. Monitoring of the nanoparticles during matrix acidizing informs the operator of the amount of fluids being produced during the operation and further provides a measurement on the value of the matrix acidizing operation.

In yet other embodiments, the nanoparticles may be used to determine fluid flow paths through the subterranean formation and into produced fluids. For instance, the nanoparticles may be introduced into an injection fluids during at least one of water flooding, steam assisted gravity drainage, steam flooding, cyclic steam stimulation, or other enhanced oil recovery stimulation processes.

In other embodiments, different nanoparticles are preferably introduced into the aqueous fluid introduced into the different injection wells. Fluids produced from one or more production wells may be analyzed for the presence of the nanoparticles in the produced fluid. The presence of nanoparticles in produced fluids from a production well may indicate water breakthrough. Thus, not only can water breakthrough in the production well be determined but the injection well from which the water has flowed in into the production well can be identified. The injection well, into which the water in the breakthrough water has been determined to have been initially introduced, can be shut off. Thus, the nanoparticles can be used to optimize enhancement of hydrocarbons during secondary recovery operations by shutting down the injection well and thus terminating the flow of water from the injection well directly into the production well.

The nanoparticles used in this embodiment are typically water soluble. Nanoparticles are introduced into the aqueous fluid which is then introduced into the injection well. The aqueous fluid introduced into each of the injection wells contains qualitatively distinguishable nanoparticles. The aqueous fluid serves to maintain pressure in the hydrocarbon-bearing reservoir. The pressure is maintained above the bubble point. Should nanoparticles be detected in produced fluid from the production well, the operator would know to take remedial action and shut down the injection well from which the nanoparticles had originally been introduced. The injection well, once shut down, may be repaired to prevent further flow of aqueous fluid into the production well.

When used as a tracer, the tracer may be a solid or liquid. Where the tracer is a solid, the tracer may be dissolved in a suitable solvent.

The nanoparticles may be a component of a composite where it is immobilized within a matrix (such as an emulsion) or porous particulate, onto a support or compressed with a binder into a solid particulate. The nanoparticles may thus slowly be released into the produced fluid as it is solubilized. Where the tracer is a liquid, the tracer is slowly released into the produced fluid, the rate of release being dependent upon the surface charges between the tracer and matrix or support.

The amount of composite present in the well treatment fluid is typically between from about 15 ppm to about 100,000 ppm.

Suitable composites are those capable of providing a means of slowly releasing the nanoparticle into the subterranean formation. The nanoparticle in such composites is preferably liquid. If the nanoparticle is a solid, it can be dissolved in a suitable solvent, thus making it a liquid.

Composites of Solid Adsorbents.

The composite may contain a nanoparticle adsorbed onto a water-insoluble adsorbent. Typically, a polymeric coating encapsulates the water-insoluble adsorbent. The polymerice coating may be a thermosetting resin. Exemplary thermosetting resins include polystyrene, a styrene-divinylbenzene copolymer, a polyacrylate, a polyalkylacrylate, a polyacrylate ester, a polyalkylacrylate ester, a modified starch, a polyepoxide, a polyurethane, a polyisocyanate, a phenol formaldehyde resin, a furan resin, or a melamine formaldehyde resin.

The nanoparticles are adsorbed onto the adsorbent or within the interstitial pores of the adsorbent such they may be slowly released from the adsorbent upon introduction of the composite into the formation or into a fracture. The controlled slow release of the nanoparticle may be dependent upon the surface charges between the nanoparticle and support which, in turn, may be dependent on the adsorption/desorption properties of the nanoparticle to adsorbent, pH variations, salinity, hydrocarbon composition, temperature, and pressure.

The amount of nanoparticle in the composite is that amount sufficient to effectuate the desired result over a sustained period of time. Generally, the amount of nanoparticle in the composite is from about 0.05 to about 5 (preferably from about 0.1 to about 2) weight percent based upon the total weight of the composite.

The water insoluble adsorbent may be any of various kinds of commercially available high surface area materials having the affinity to adsorb the nanoparticle. Typically, the surface area of the adsorbent of the nanoparticle is between from about 1 $m^2/g$ to about 100 $m^2/g$.

Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or metasilicates, calcium silicate, sand (e.g., 20-40 mesh), bauxite, kaolin, talc, zirconia, boron and glass, including glass microspheres or beads, fly ash, zeolites, diatomaceous earth, ground walnut shells, fuller's earth and organic synthetic high molecular weight water-insoluble adsorbents. Particularly preferred are diatomaceous earth and ground walnut shells.

Further useful as adsorbents are clays such as natural clays, preferably those having a relatively large negatively charged surface, and a much smaller surface that is positively charged. Other examples of such high surface area materials include such clays as bentonite, illite, montmorillonite and synthetic clays.

The weight ratio of nanoparticle to water-insoluble adsorbent is generally between from about 90:10 to about 10:90.

The composite may be prepared by adding the nanoparticle to the adsorbent and mixing until the nanoparticle is readily absorbed. The polymeric coating is then (optionally) applied over the adsorbent and the product may then be dried at elevated temperatures (for instance, from about 220° F. to about 250° F. until the percent moisture of the resulting product is less than 3%.

The composite has limited solubility in water (when produced water is being detected or measured) or hydrocarbons (when produced hydrocarbons are being detected or measured). When placed into a production well, the nanoparticle slowly dissolves at a generally constant rate over an extended period of time in the water which is contained in the formation. The controlled slow release of the agent is dependent upon the surface charges between the nanoparticle and adsorbent which, in turn, is dependent upon the adsorption/desorption properties of the nanoparticle to adsorbent.

Composite of Porous Particulates.

Suitable composites also include those composed of a porous particulate and at least one nanoparticle. Typically, the particle size of the porous particulate is between from about 0.3 mm to about 5 mm, preferably between from about 0.4 to about 2 mm. The porosity and permeability of the porous particulate is such that the nanoparticle may be absorbed into the pores of the porous particulate material. Typically, the porosity of the porous particulate is between from about 5 to about 30 volume percent. A commercially available instrument which uses mercury intrusion, such as the AutoPore Mercury Porosimeter (Micromeritics, Norcross, Ga.), for measuring the internal porosity of the particulate and the interstitial volume (of a pack) may be used to determine the porosity of the porous particulate. Generally, the amount of nanoparticle in the composite is from about 0.05 to about 5 (preferably from about 0.1 to about 2) weight percent based upon the total weight of the composite.

Examples of types of materials suitable for use as porous particulates include particulates having a porous matrix. The porous particulates are generally spherical and insoluble in well fluids under subterranean conditions, such as at temperatures less than about 250° C. and pressures less than about 80 MPa. The particulates may be sufficiently strong to be used on their own at high pressures. They may further be used in conjunction with nanoparticles including non-porous proppant materials, such as sand. Since the nanoparticles employed in the composites are capable of being absorbed into the interstitial spaces of the porous particulates, they may be slowly released from the porous particulates into produced fluids. Produced fluids may therefore be exposed to a continuous supply of nanoparticle.

Suitable as porous particulates are those particulates set forth in U.S. Pat. Nos. 5,964,291 and 7,598,209, herein incorporated by reference. For instance, the porous particulate of the composite may be any naturally occurring or manufactured or engineered porous ceramic particulate, as well as any organic polymeric material, that has an inherent and/or induced porosity and exhibits the requisite physical properties, such as particle characteristics, desired strength and/or apparent density, to fit particular downhole conditions.

Suitable as inorganic ceramic materials are alumina, magnetic glass, titanium oxide, zirconium oxide, silicon carbide, aluminosilicates and other silica-based materials. Examples of non-natural porous particulate materials include, but are not limited to, porous ceramic particles, such as fired kaolinitic particles, as well as partially sintered bauxite. The porous particulates may further be porous natural ceramic materials, such as lightweight volcanic rocks, like pumice, as well as perlite and other porous "lavas" like porous (vesicular) Hawaiian Basalt, porous Virginia Diabase and Utah Rhyolite. Such naturally occurring materials may be strengthened or hardened by use of modifying agents to increase the ability of the naturally occurring material to resist deformation. A starch binder may be employed.

In a preferred embodiment, the porous particulate material is a relatively lightweight or substantially neutral buoyant particulate material. The term "relatively lightweight" shall refer to a particulate that has an ASG (API RP 56) that is substantially less than a conventional particulate material employed in well treatment operations, e.g., sand (having an ASG, API RP 60, of 2.65) or bauxite (having an ASG of 3.55). The ASG of a relatively lightweight material is preferably less than about 2.4, more preferably less than or equal to 2.0, even more preferably less than or equal to 1.75, most preferably less than or equal to 1.25.

When used in a hydraulic fracturing operation, the porous particulate is selected so as to optimize geometries to achieve enhanced well productivity, such as to achieve increased propped fracture length in relatively "tight" gas formations. Choice of different particulate materials and amounts thereof to employ in such blends may be made based on one or more well treatment considerations including, but not limited to, objectives of well treatment, such as creation of propped fractures, well treatment fluid characteristics, such as apparent specific gravity and/or rheology of carrier fluid, well and formation conditions such as depth of formation, formation porosity/permeability, formation closure stress, type of optimization desired for geometry of downhole-placed particulates such as optimized fracture pack propped length, optimized sand control pack height, optimized fracture pack and combinations thereof. Typically, the specific gravity of the nanoparticle is ±0.25 g/cc of the proppant in order to insure the desired placement within the proppant pack.

The composites may be prepared by conventional processes, such as electrofusion, spray-drying and pelletization. In a preferred embodiment, the composites are prepared by placement of the porous particulate into a dilute solution or suspension of the nanoparticle and permitting the porous particulate to imbibe the nanoparticle.

Calcined Metal Oxides.

The composite may further be composed of a nanoparticle and a calcined metal oxide. Such composites include those wherein a nanoparticle is adsorbed onto a nano-sized calcined porous substrate of high surface area. The nanoparticle is slowly released from the adsorbent and may be slowly released.

The porosity and permeability of the calcined porous substrate is such that the nanoparticle may also be absorbed into the interstitial spaces of the porous substrate. Typically, the surface area of the calcined porous substrate is between from about 1 $m^2/g$ to about 10 $m^2/g$, preferably between from about 1.5 $m^2/g$ to about 4 $m^2/g$, the diameter of the calcined porous substrate is between from about 0.1 to about 3 mm, preferably between from about 150 to about 1780 micrometers, and the pore volume of the calcined porous substrate is between from about 0.01 to about 0.10 g/cc. The porous metal oxide is typically spherical and insoluble in well fluids under subterranean conditions, such as at temperatures less than about 250° C. and pressures less than about 80 MPa.

The porous substrate may be a metal oxide, such as alumina, zirconium oxide and titanium oxide. Typically, the porous substrate is alumina.

The adsorbent may be prepared by:
(a) mixing a metal oxide hydrosol (such as aluminum oxide hydrosol) containing a hydrate of the metal oxide or activated metal (such as activated alumina) and an additive component selected from carbon (such as carbon black) or a high molecular weight natural organic material (such as wood flour and starch) which is insoluble in aqueous solution up to a temperature of 50° C. and carbon with a solution of hydrolyzable base to form a mixture;
(b) introducing the mixture in dispersed form into a water-immiscible liquid having a temperature of from about 60° to 100° C., whereby gel particles are formed;
(c) aging the gel particles in the liquid at the temperature and subsequently in an aqueous base, such as an aqueous ammonia solution;
(d) recovering the aged particles; and then
(e) calcining the recovered particles. During calcination, the additive component is removed. The calcined particles have a lower bulk density when the additive component is present during calcinations than when the additive component is not present. Typically, the bulk density of the composite is between from about 75 to about 150 lb/ft$^3$. In addition, combustion of the additive component during calcinations of the hydrosol results in formation of pores of the calcined metal oxide.

The metal oxide hydrosol may optionally contain a silica-containing substance which in their non-soluble form is coprecipitated with the metal oxide particles. The silica-containing substance is preferably a low density silica, such as that prepared by hydrolysis of silicon tetrachloride in an oxyhydrogen flame and known under the designation pyrogenic silica.

In an embodiment, spherical metal oxide adsorbent may be prepared from a concentrated metal oxide hydrosol of a pH value in the range of about 3 to about 5 which, in turn, is prepared by dissolving metal in hydrochloric acid and/or metal chloride in aqueous solution or by dissolving metal hydroxychloride in water, the concentration of which is adjusted so that metal oxide derived from the sol amounts to 15 to 35% by weight, preferably to 20 to 30% by weight of the mass of the calcined particles. Metal oxide hydrate and/or activated metal, preferably of an average particle diameter of maximally 10μ, is then added to the hydrosol in an amount so that the metal oxide content amounts to 65 to 85% by weight, preferably 70 to 80% by weight of the calcined particles. Optionally, pyrogenic silica may be added to the hydrosol such that the $SiO_2$ content of the calcined particles amounts to 10 to 40% by weight. A soft to medium-hard wood flour may then added to the mixture, the wood flour being ground to a finer particle size such that it is present in a quantity of 5 to 35% by weight, preferably 10 to 25% by weight relative to the mass of the calcined particles. The hydrosol containing the wood flour may then be mixed with a concentrated aqueous solution of hexamethylene tetraamine and then sprayed or dropped into a column filled with the mineral oil of a temperature of 60° C. to 100° C. The gel particles are then allowed to remain at the temperature of precipitation for a period of time from 4 to 16 hours; thereafter the gel particles are aged for 2 to 8 hours in aqueous ammonia solution, washed with water, dried at 100° C. to 150° C., or preferably at from about 120° C. to about 200° C., preheated to 250° C. to 400° C. and calcined at a temperature of 600° C. to about 1000° C.

Alternative methods for making metal oxide adsorbent are further disclosed in U.S. Pat. No. 4,013,587, herein incorporated by reference.

In a preferred embodiment, when the metal oxide adsorbent is alumina adsorbent, the adsorbent may be prepared by hydrolyzing aluminum alkoxides to render nano sized alumina, drying to remove water and then introducing the dried aluminum in a dispersed form into an oil at a temperature of from about 60° to 100° C., whereby gel particles are formed. The gel particles are then aged in the liquid and subsequently in an aqueous ammonia solution, recovered and then calcined. Nano sized alumina may be produced having an average diameter in the range from about 0.4 mm to about 1 mm.

Generally, the amount of nanoparticle in the composite is from about 0.05 to about 5 (preferably from about 0.1 to about 2) weight percent based upon the total weight of the composite. The concentration of the nanoparticle in the wellbore is between from about 1 to about 50 ppm and may be as low as 1 ppm. Such small amounts of nanoparticle may be sufficient for up to 1,000 pore volumes.

The composites may be prepared by first adsorbing water onto adsorbent until the adsorbent appears wet followed by the addition of the nanoparticle. The product may then be dried at elevated temperatures (for instance, from about 220° F. to about 250° F. until the percent moisture of the resulting product is less than 3%.

Shaped Composites.

The composite described in the above sections may be in any form or shape. In a preferred embodiment, the composite is formed into a shaped compressed composite by adding the composite to a binder and subjecting the resultant product to compression.

Suitable binders may be an organic binder or inorganic binder. Typical organic binders are those selected from resole or novolac resins, such as phenolic resole or novolac resins, epoxy-modified novolac resins, epoxy resins, polyurethane resins, alkaline modified phenolic resoles curable with an ester, melamine resins, urea-aldehyde resins, urea-phenol-aldehyde resins, furans, synthetic rubbers, silanes, siloxanes, polyisocyanates, polyepoxys, polymethylmethacrylates, methyl celluloses, crosslink entangled polystyrene divinylbenzenes, and plastics of such polymers as polyesters, polyamides, polyimides, polyethylenes, polypropylenes, polystyrenes, polyolefins, polyvinyl alcohols, polyvinylacetates, silyl-modified polyamides and, optionally, a crosslinking agent. Typical inorganic binders include silicates, e.g., sodium silicate, aluminosilicates, phosphates, e.g., polyphosphate glass, borates, or mixtures thereof, e.g., silicate and phosphate.

The amount of binder added to the composite to form the shaped compressed composite is typically from about 0.5 to about 50, preferably from about 1 to about 5 percent based on the total weight of the binder and composite, prior to compression.

The shaped particulates may be produced by procedures known in the art. Typically the shaped particulates are formed by combining the composite and, optional, weighting agent, with a binder and then compressing the mixture in a mold of the desired shape or extruding the mixture into its desired shape.

Exemplary of the process for making the shaped compressed composite is to combine the composite, prepared in accordance with the teachings set forth in U.S. Pat. Nos. 7,493,955 or 7,494,711, with an organic binder and then compressing the mixture at a temperature between from about 20° C. to about 50° C. at a pressure of from between 50 to about 5000 psi. The hardened particulates may then be screened to the desired size and shape. In another preferred embodiment, the shaped composites are produced by a continuous extrusion at a temperature between from about 400° C. to about and 800° C.

The shaped composites may further be coated with a resin, plastic or sealant which is resistant to the hydrocarbons produced in the well. Suitable resins include phenolic resins like phenol formaldehyde resins, melamine formaldehyde resins, urethane resins, epoxy resins, polyamides, such as nylon, polyethylene, polystyrene, furan resins or a combination thereof.

The coating layer serves to strengthen the compressed composite, protect the shaped composite from harsh environmental conditions, protect the shaped composite from rupturing as it is lowered into the well and to lengthen the time of release of the nanoparticle from the shaped compressed composite. The coating layer may be applied to the shaped composite by mixing the shaped composite and coating material in a vessel at elevated temperatures, typically from about 200 to about 350, preferably around 250° F. An adherent, such as a resin adhesive or tackifying resin, may further be added to the vessel during mixing. The adherent may be used to assist the adhesion of the coating onto the compressed composite. Alternatively, the coating layer may also be applied as a spray in a solvent based coating on the shaped compressed composite and then dried to remove the solvent.

The nanoparticle is slowly released from the shaped compressed composite after being introduced into a targeted area in the well. The targeted area may be a site in the well where deposits have already formed or a location in the well where it is desirable for deposits not to form. The shaped compressed composite provides a continuous supply of the nanoparticle into the targeted area.

The shaped compressed composite is preferably a pellet and may be in the form of a sphere, cylinder, rod or any other shape which allows for the slow release of the nanoparticle into the targeted area. In some applications, the shaped compressed composite are cylindrically shaped having a length of about 0.5 inch to about 6 inches, preferably from about 1 inch to about 2 inches and a diameter of from about 0.25 inch to about 4 inches, preferably from about 0.5 inch to about 1 inch.

The specific gravity of the shaped compressed composite is generally between from about 1.1 to about 3. In a preferred embodiment, the specific gravity of the shaped compressed composite is between from about 2 to about 2.5.

Composites as Microemulsions.

The composite containing the nanoparticle may further be contained in an emulsion wherein the nanoparticle is in the discontinuous phase or the continuous stage of the emulsion. Suitable emulsions are those set forth in U.S. Pat. No. 7,380,606 and U.S. Patent Publication No. 2008/0287324, both of which are herein incorporated by reference.

Preferred emulsions include those containing emulsified solvent-surfactant blends prepared by combining a solvent-surfactant blend and a diluent. The emulsified solvent-surfactant blend may be combined with a water-based or oil-based carrier fluid to form a microemulsion.

The solvent-surfactant blend generally includes a solvent, a surfactant and an alcohol. In one embodiment, the solvent is selected from the group of unsaturated aliphatic cyclic hydrocarbons known as terpenes, including monoterpenes and diterpenes such as monoterpene d-limonene ($C_{10}H_{16}$). Alternatively, the terpene-based solvent may be replaced with alkyl, cyclic or aryl acid esters of short chain alcohols, such as ethyl lactate and hexyl ester.

If a water-based carrier fluid is chosen, the surfactant of the solvent-surfactant blend should be capable of creating an oil-in-water microemulsion upon combination with an appropriate quantity of water. Preferred surfactants are biodegradable and have an HLB (hydrophile-lipophile balance) value of between about 8 to about 20. Preferred surfactants may be cationic, anionic, zwitterionic, or nonionic. Presently preferred oil-in-water surfactants include one or more of the following: Tween® 40 (polyoxyethylene sorbitan monopalmitate), Tween® 60 (polyoxyethylene sorbitan monostearate), Tween® 80 (polyoxyethylene sorbitan monooleate), linear alcohol alkoxylates, alkyl ether sulfates, dodecylbenzene sulfonic acid (DDBSA), linear nonyl-phenols, dioxane, ethylene oxide, polyethylene glycol, and ethoxylated castor oils such as PEG castor oil. A preferred oil-in-water surfactant mixture includes polyoxyethylene sorbitan monopalmitate, ethoxylated castor oil and polyethylene glycol.

Alternately preferred oil-in-water surfactants can also include dipalmitoyl-phosphatidylcholine (DPPC), sodium 4-(1' heptylnonyl) benzenesulfonate (SHPS or SHBS), polyoxyethylene (8.6 mole) nonyl phenyl ether, AEROSOL® OT (sodium dioctyl sulfosuccinate), tetraethyleneglycoldodecylether, sodium octlylbenzenesulfonate (OBS), sodium hexadecyl sulfate (SCS), IsalChem® 145 (PO) (isomeric primary alcohol (oxypropylene surfactant)), sodium alkyl ether sulfate, sodium laureth sulfate POE(2) (SLES), ethylene oxide (EO), sulfonates (i.e., alkyl propoxy-ethoxysulfonate), alkyl propoxy-ethoxysulfate, alkylaryl-propoxyethoxysulfonate and highly substituted benzene sulfonates (n-C12-oxylene-$SO_3$—).

If an oil-based carrier fluid is chosen, the surfactant of the solvent-surfactant blend should be capable of creating a water-in-oil microemulsion upon combination with oil. Preferred surfactants may be cationic, anionic, zwitterionic, or nonionic. Preferred surfactants are biodegradable and have an HLB value of between about 3-8. Presently preferred water-in-oil surfactants include Span® 40 (sorbitan monopalmitate), Span® 60 (sorbitan monostearate), Span® 80 (sorbitan monooleate), linear alcohol alkoxylates, ethoxylated castor oil, and polyethylene glycol. A preferred water-in-oil surfactant mixture includes sorbitan monopalmitate, ethoxylated castor oil and polyethylene glycol.

The alcohol component of the solvent-surfactant blend serves as a coupling agent between the solvent and the surfactant, thereby stabilizing the microemulsion. The alcohol also lowers the freezing point of the microemulsion. Although isopropanol is presently preferred, alternative suitable alcohols include midrange primary, secondary and tertiary alcohols with between 1 and 20 carbon atoms, such as t-butanol, n-butanol, n-pentanol, n-hexanol and 2-ethylhexanol. Other freeze prevention additives can additionally or alternatively be added, such as detergent range alcohol ethoxylates, ethylene glycols (EG), polyethylene glycols (PEG), propylene glycols (PG) and triethylene glycols (TEG), with triethylene glycol being presently preferred.

The solvent-surfactant blend optionally includes a salt. The addition of a salt to the solvent-surfactant blend reduces the amount of water needed as a carrier fluid and also lowers the freezing point of the microemulsion. Among the salts that may be added for stability and co-solvent substitution, NaCl, KCl, $CaCl_2$, and $MgCl_2$ are presently preferred. Others suitable salts can be formed from K, Na, Zn, Br, Sr, Cs, Li, and Ca families.

After blending the solvents, surfactants and alcohols, it may be desirable to form a diluted solvent-surfactant blend by adding a diluent before addition to the carrier fluid. Presently preferred diluents include water and water and triethylene glycol (TEG) mixtures. A particularly preferred diluent is 90% by volume water and 10% by volume triethylene glycol. It will be understood that upon addition of the diluent, the solvent-surfactant blend may partially or completely emulsify. It will also be understood that complete emulsification includes, without limitation, microemulsification.

For oil-in-water microemulsions, the solvent-surfactant blend preferably includes about 36%-76% by volume of the surfactant, about 14%-54% by volume solvent, and about 0%-20% alcohol by volume. In a particularly preferred embodiment, the oil-in-water solvent-surfactant blend includes about 56% by volume of the preferred oil-in-water surfactant mixture (polyoxyethylene sorbitan monopalmitate, ethoxylated castor oil and polyethylene glycol), about 34% by volume d-limonene, ethyl lactate or combinations thereof, and about 10% by volume isopropanol.

In an alternatively preferred embodiment, the oil-in-water solvent-surfactant blend is diluted with about 0%-50% by volume of diluent. The diluted solvent-surfactant blend preferably includes water and more preferably includes about 45% by volume water and about 5% by volume triethylene glycol. Accordingly, the preferred diluted solvent-surfactant blend includes about 27% by volume of the preferred oil-in-water surfactant mixture, about 17% by volume d-limonene, about 5% by volume isopropanol, about 45% by volume water and about 5% by volume triethylene glycol.

For water-in-oil microemulsions, the solvent-surfactant blend preferably includes about 36%-76% by volume of the surfactant, about 14%-54% by volume solvent and about 0%-20% by volume alcohol. In a particularly preferred embodiment, the water-in-oil solvent-surfactant blend includes about 56% by volume of the preferred water-in-oil surfactant mixture (sorbitan monopalmitate, ethoxylated castor oil and polyethylene glycol), about 34% by volume d-limonene, ethyl lactate or a combination of d-limonene and ethyl lactate, and about 10% by volume isopropanol. The water-in-oil solvent-surfactant blend forms a microemulsion upon combination with diesel or kerosene to form a preferred water-in-oil microemulsion.

In an alternatively preferred embodiment, the water-in-oil solvent-surfactant blend is combined with about 0%-50% by volume of a diluent prior to adding the carrier fluid to form a diluted water-in-oil solvent-surfactant blend. More preferably, about 50% by volume of diluent is added to the water-in-oil solvent-surfactant blend. The diluent is preferably an oil-based fluid such as diesel, kerosene, jet fuel, crude oil, condensate, an ester, linear-.alpha.-olefin, poly-.alpha.-olefin, internal olefin, paraffin, linear alkyl benzene, ester, acetal, or other synthetic. In a preferred embodiment, diesel or condensate is used as a diluent. It will be understood that upon addition of the diluent, the water-in-oil solvent-surfactant blend may partially or completely emulsify. It will also be understood that complete emulsification includes, without limitation, microemulsification.

In a preferred embodiment, the emulsion is a thermally stable microemulsion formed by the combination of solvent-surfactant blends with an oil-based fluid. The oil phase may form either the continuous or discontinuous phase of the microemulsion. The microemulsion may be considered as small-scale versions of emulsions, i.e., droplet type dispersions either of oil-in-water or water-in-oil with an average particulate size ranges in the order of about 5 to about 50 nm in drop radius. In emulsions, the average drop size grows continuously with time so that phase separation ultimately occurs. The drops of the emulsion are generally large (>0.1 microns) and often exhibit a milky or cloudy, rather than a translucent, appearance as seen in microemulsions.

The particle size of the nanoparticle in the emulsion is normally between from about 0.001 microns to about 100 microns. In some instances, the particle size of the nanoparticle is less than or equal to 0.05 microns.

The water-in-oil microemulsion may be a solvent-surfactant blend added to an aqueous diluent. The solvent-surfactant blend may, optionally, contain an alcohol. The solvent-surfactant blend may include from about 35 to about 80% by volume of surfactant, from about 14% to about 54% by volume solvent and from 0 to about 20% by volume alcohol. The amount of water in the water-in-oil microemulsion is typically no greater than 50 volume percent, preferably no greater than about 30 volume percent. The amount of hydrocarbon in the oil-in-water microemulsion is typically no greater than 50 volume percent, preferably no greater than about 30 volume percent.

To the base water-in-oil microemulsion, a water-based nanoparticle is added with minimal mixing when the nanoparticle preferentially gets into the water phase of the microemulsion. Similarly, to a base oil-in water microemulsion, a hydrocarbon based nanoparticle can be added with minimal mixing, when the nanoparticle gets into the hydrocarbon phase of the microemulsion.

The solvent-surfactant blends, dilute or concentrated, can be added to the water and oil-based carrier fluids in sparing amounts to prepare the desired microemulsions. For example, in many applications, as little as 0.2%-2% by volume of solvent-surfactant blend in water or oil based-carrier fluids will be sufficient. In other applications, however, it may be desirable to use a more concentrated microemulsion. In such applications, the microemulsion preferably includes about 0.5% to about 90% of the selected solvent-surfactant blend. In another preferred application, the microemulsion includes about 0.05% to about 50% by volume of the solvent-surfactant blend. Furthermore, it will be understood that in some applications, it may be desirable to apply the solvent-surfactant blend, diluted or concentrated, without the addition of a carrier fluid. For example, the solvent-surfactant blend can be pumped downhole where it will incorporate water and water-based materials to form the microemulsion in situ. Once formed, the microemulsion can be pumped from the wellbore to the surface. In another embodiment, the solvent-surfactant blend can be injected downhole via a capillary injection assembly and to mix in situ with water or oil-based fluid, to form the microemulsion.

The nanoparticle is added to the microemulsion prior to its introduction into the well. The amount of nanoparticle in the microemulsion is normally from about 2 to 20 weight percent, preferably from about 3 to about 12 weight percent, more preferably from about 4 to about 8 weight percent.

The amount of microemulsion in the treatment fluid is typically between from about 15 ppm to about 100,000 ppm.

When placed into a well, the nanoparticle slowly demulsifies from the microemulsion at a generally constant rate over an extended period of time into the water or hydrocarbons which are contained in the formation, well, conduit or vessel. The microemulsion therefore permits a continuous supply of the nanoparticle into the targeted area.

The composite containing the nanoparticle is carried into the well and/or formation in a water-based or oil-based carrier fluid. Water-based carrier fluids include fresh water and brine. Oil-based carrier fluids include liquid hydrocarbons such as diesel, kerosene, jet fuel, crude oil, and condensate as well as synthetic fluids like esters, linear α-olefins, poly-α-olefins, internal olefins, paraffins, linear alkyl benzenes, esthers and acetals. In addition, the carrier fluid may be a gas such as nitrogen or carbon dioxide. The fluid may be gelled or non-gelled. In one embodiment, the composite may be introduced or pumped into a well as neutrally buoyant particles in the carrier fluid.

Preferred embodiments of the present disclosure thus offer advantages over the prior art and are well adapted to carry out one or more of the objects of this disclosure. However, the present disclosure does not require each of the components and acts described above and is in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

All percentages set forth in the Examples are given in terms of weight units except as may otherwise be indicated.

EXAMPLES

Example 1

Synthesis of Peroxide Precursor. Succinic acid peroxide was first prepared by adding about 10 g of succinic anhydride fine powder was added to 20 mL of ice cold 8% hydrogen peroxide and stirred for 30 min until all of the powder dissolved and a white gel like solution formed. The solution was filtered onto a 1-μm pore size PTFE membrane (Cole Palmer) to leave a deposit which was washed with a small amount of water and air-dried for 10 min. The white peroxide products were transferred from the membrane to a glass vial and vacuum-dried at room temperature for 24 hours.

Example 2

Functionalization of the Fe@C. The carbon encapsulating the metallic iron core was functionalized with carboxylic groups by adding 0.02 g of the Fe@C, commercially available from Sigma-Aldrich, to 200 mL of dry o-dichlorobenzene and sonicating the mixture for 30 minutes. This was heated in a $N_2$ atm at 110° C. for 2 days with periodic addition of 2.5 g of succinic acid peroxide. After the reaction completed, the product was washed by pouring into a large quantity of chloroform and sonicated for 30 min and then filtered. The final product was washed multiple times with tetrahydrofuran and ethanol. The products were characterized with FT-IR.

Example 3

Synthesis of Fe@C—CNx Nanoparticle. Carbon nitride was surface coated over the functionalized Fe@C of Example 2. About 5.2 mmol of lithium nitride and 10.4 mmol of cyanuric chloride and 150 ml of dry diglyme were added to a round bottom flask and refluxed in nitrogen atmosphere for 24 hours. The slowly precipitating yellow powder was filtered of diglyme, washed with ethanol and water and then dried in vacuum oven. This powder was again redispersed in water and magnetically active material alone separated with strong magnet and used for further analysis.

The particles showed strong magnetic behavior upon being separated by the lab magnet from the reaction mixture solution. The spherical particles had higher quantum efficiency than that of the high temperature reaction products cyanuric chloride and lithium nitride.

Example 4

Figure 2:
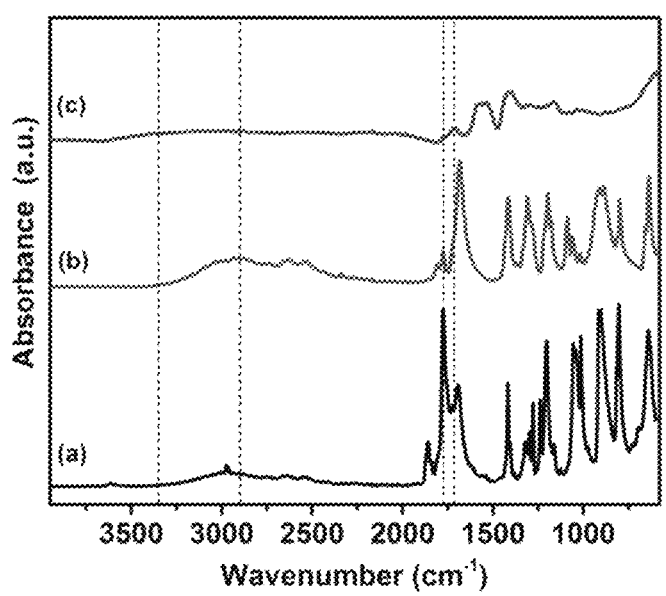
FIG. 2 is an ATR-FTIR spectra of (a) succinic anhydride (b) succinic acid peroxide and (c) functionalized Fe@C and demonstrates the covalent functionalization of Fe@C.

Characterization of Fe@C—$CN_x$ Nanoparticle by FTIR. The functionalization process was confirmed by the presence of chemical signature from FTIR. FTIR was performed by Attenuated Total Reflectance (ATR) mode using Thermo Fisher with use of Diamond ATR accessory. The measurements on samples placed over the diamond ATR accessory were performed at 32 scans data collection and with the resolution of 4 $cm^{-1}$. FIG. 2 shows the ATR-FTIR spectrum of (a) succinic anhydride, (b) succinic acid peroxide and (c) functionalized Fe@C. The FTIR analysis shows a broad band around the 3000-3500 $cm^{-1}$ related to O—H and C—H around 2850 to 3000 $cm^{-1}$. The further presence of absorption peaks near 1700 $cm^{-1}$ are characteristic of the acid carbonyl group and peak at 1812 $cm^{-1}$ assigned to the peroxide carbonyls. The presence of these peaks in the functionalized Fe@C confirms the functionalization process. The functionalization process tends to oxidize the metal. This oxidation may be due to the reagents or temperature. This method seems to be mild to the carbon surface and keeps the Fe core intact without oxidation.

Example 5

Figure 3:
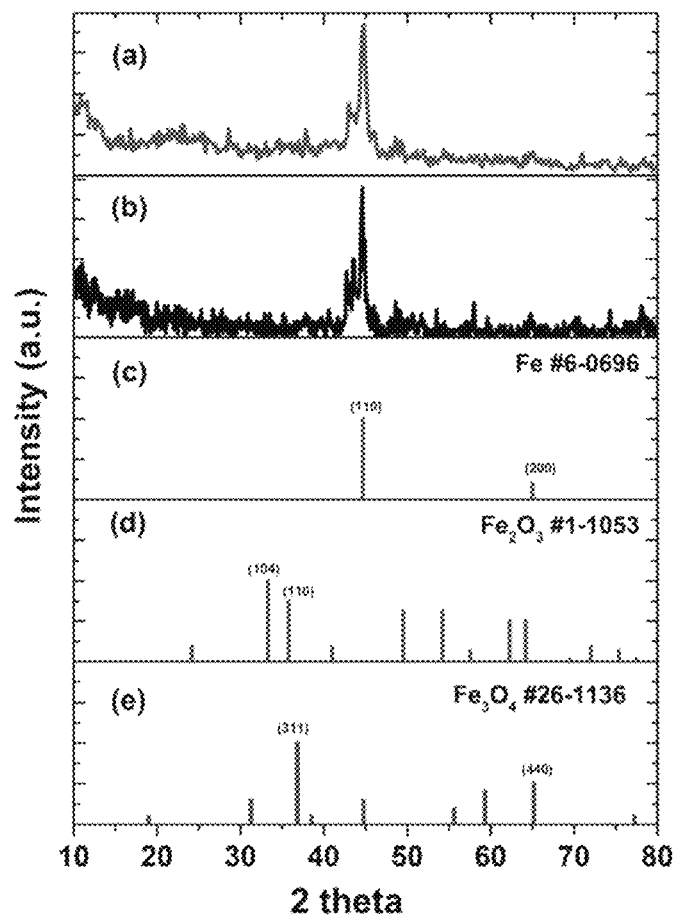
FIG. 3 is an XRD analysis of (a) functionalized Fe@C, (b) Fe@C, (c) pure metallic Fe, (d) $Fe_2O_3$ and (e) $Fe_3O_4$.

Characterization of Fe@C—$CN_x$ by XRD. XRD was performed to find any change in the oxidation of the Fe core in Fe@C during functionalization. The change in crystallinity of Fe@C by the functionalization process was determined by X-ray diffraction (XRD) with a Model Rigaku D/Max Ultima II with a Cu Kα radiation 40 kV and 40 mA. X-ray photoelectron spectroscopy (XPS) data were collected on a Physical Electronics PHI 7500 X-ray photoelectron spectrometer with an Al Kα radiation source (1486.6 eV), a power setting of 350 W and an analyzer pass energy of 23.5 eV. FIG. 3 shows the XRD analysis of (a) functionalized Fe@C, (b) Fe@C, (c) pure metallic Fe, (d). $Fe_2O_3$, and (e) $Fe_3O_4$. FIG. 3 shows that there is no oxidation Fe@C after the functionalization.

Example 6

Figure 6:
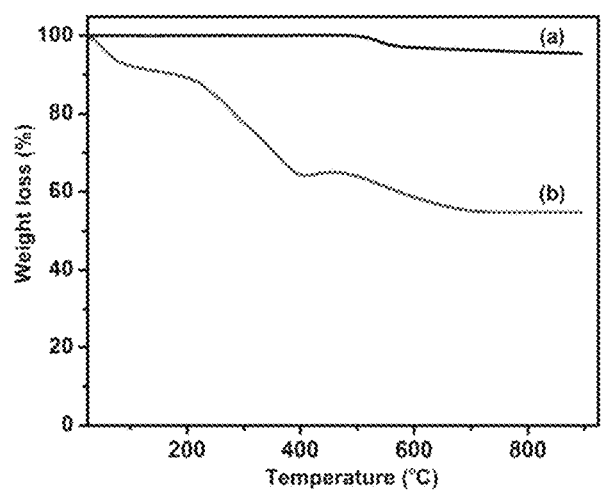
FIG. 6 demonstrates the TGA analysis of Fe@C and functionalized Fe@C.

Characterization of Fe@C—CN$_x$ by TGA. The total amount of functionalization over the surface of Fe@C was calculated using thermogravimetric analysis (TGA) experiments with a TA Q500 with the purge gas nitrogen at a flow rate of 40 mL/min with heating rate of 10° C./min up to 900° C. The change in weight with temperature was plotted. From the analysis, shown in FIG. 6, the weight change is about 40%.

Example 7

Figure 5:
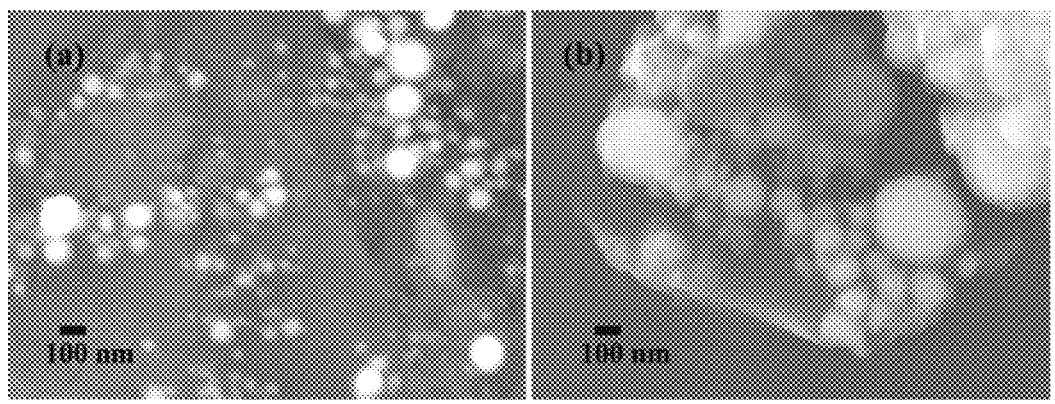
FIG. 5 is a SEM analysis of (a) Fe@C and (b) functionalized Fe@C at 50000× magnification 15 kV energy with working distance of 10 mm in SEM mode using LED detector.

Characterization of Functionalized Fe@C and Fe@C—CN$_x$ by SEM. The morphology of functionalized Fe@C and Fe@C—CN$_x$ was analyzed by Scanning Electron Microscopy using a field emission scanning electron microscope—JEOL JSM-7800. EDS analysis was performed to determine the relative ratios of carbon, nitrogen present on the Fe@C—CN$_x$. The initial SEM analysis, shown in FIG. 5, shows that the Fe@C is polydispersed and the presence of carbon in the Fe is about 19%. The EDS analysis before and after ethylcarboxyl functionalization of Fe@C at 15 kV with working distance of 10 mm is shown in Table I:

TABLE I

| Elements | Weight % | Atomic % | Net Int. | Error % |
|---|---|---|---|---|
| Before Functionalization | | | | |
| C K | 18.8 | 49.4 | 130.66 | 10.64 |
| O K | 3.34 | 6.58 | 60.83 | 12.46 |
| Fe K | 77.87 | 44.02 | 623.55 | 3.62 |
| After Functionalization | | | | |
| C K | 25.51 | 56.62 | 42.47 | 10.91 |
| O K | 6.58 | 10.97 | 23.96 | 13.24 |
| Fe K | 67.9 | 32.41 | 133.42 | 5.43 |

As illustrated in Table I, after the functionalization process the carbon and oxygen weight percentage increased from 19% to 26 and 3.3% to 6.5 wt. % for carbon and oxygen respectively. This gives further evidence that the functionalization process is taking place.

Figure 12:
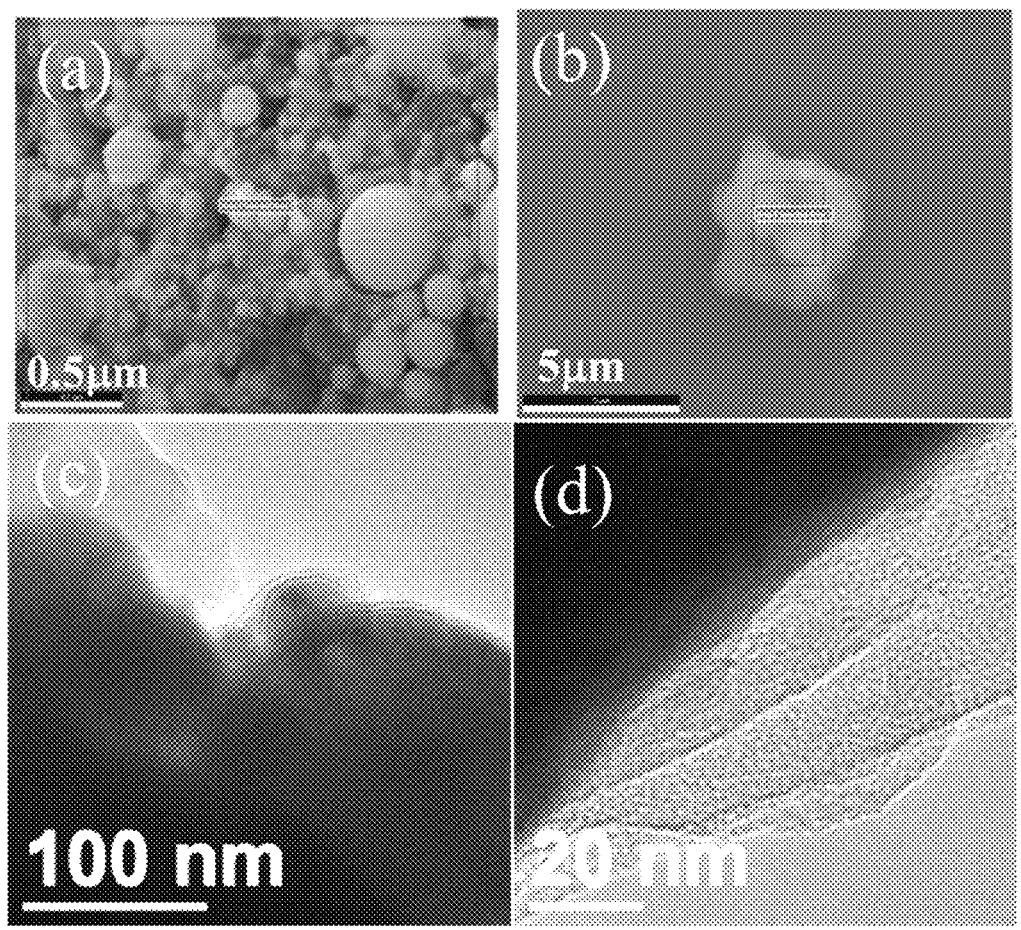
FIG. 12 shows SEM-EDS analysis of (a) Fe@C—$CN_x$, (b) $CN_x$ synthesized in the same reaction formation of clusters of $CN_x$, (c) TEM analysis of Fe@C—$CN_x$ low magnification and (d) high magnification TEM analysis of Fe@C—$CN_x$.

FIG. 12a shows SEM-EDS analysis of Fe@C—CN$_x$ and FIG. 12b shows SEM-EDS analysis of CN$_x$ synthesized in the same reaction formation of clusters of CN$_N$. This is compared with the TEM analysis of low magnification of Fe@C—CN$_x$ (FIG. 12c) and high magnification TEM analysis of Fe@C—CN$_x$ (FIG. 12d). Elemental analysis by Energy Dispersive X-ray Spectroscopy (EDS) from the SEM images of FIG. 12a and FIG. 12b at 15 kV with working distance of 10 mm samples coated on a Si substrate are given in Table 2

TABLE 2

| Elements | Weight % | Atomic % | Net Int. | Error % |
|---|---|---|---|---|
| Fe@C—CN$_x$ | | | | |
| C K | 18 | 45.3 | 127 | 10.4 |
| N K | 4.6 | 9.9 | 24.5 | 18.3 |
| O K | 2.3 | 4.3 | 36.9 | 15.9 |
| Fe K | 75.1 | 40.6 | 594.1 | 3.4 |

TABLE 2-continued

| Elements | Weight % | Atomic % | Net Int. | Error % |
|---|---|---|---|---|
| CN$_x$ | | | | |
| C K | 34.5 | 43.4 | 360.8 | 8.4 |
| N K | 39.3 | 42.4 | 171.4 | 11.3 |
| O K | 7 | 6.6 | 51.5 | 14.9 |
| Fe K | 10.1 | 2.7 | 86 | 6.9 |

Analysis of the data confirms the presence of nitrogen in the Fe@C—CN$_x$ hybrid and also few percentage of Fe present in the pure CN$_x$. It suggests that the smaller Fe@C is covered with the clusters of spherical CN$_x$ (s-CN$_x$).

Example 8

Figure 4:
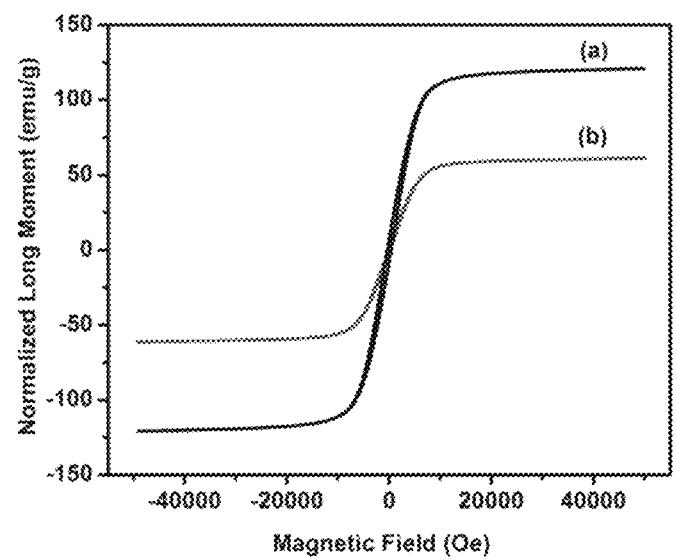
FIG. 4 is a SQUID analysis of (a) Fe@C and (b) functionalized Fe@C at 300° K.

Characterization of Fe@C—CN$_x$ by Magnetic Property Measurement System (MPMS) SQUID. The superparamagnetic property of the Fe@C, after functionalization and coated CN$_x$ was measured with a Quantum Design MPMS SQUID System. The measurements are performed in dynamic mode up to 5 Tesla with opposite polarity. All the measurements were done at 300° K. The analysis is demonstrated in FIG. 4 which shows that magnetic moment is reduced with the functionalization process which confirms the functionalization process.

Example 9

Figure 7:
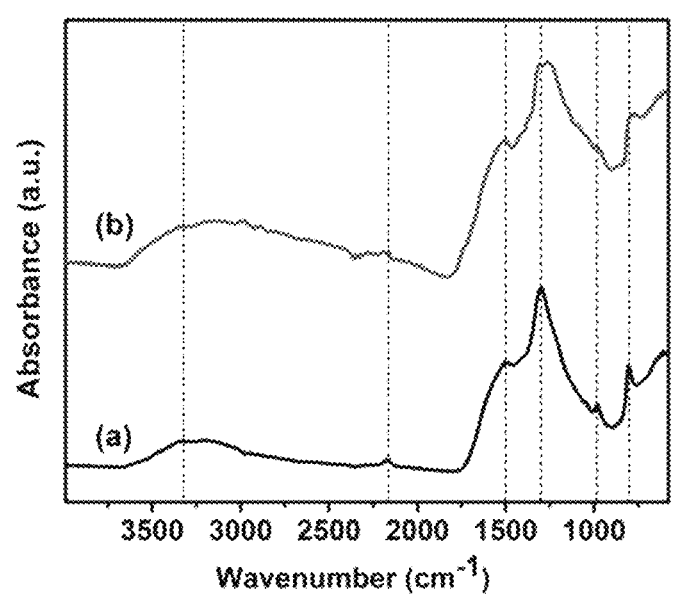
FIG. 7 is a FT-IR spectrum of synthesized spherical $CN_x$ from reaction of cyanuric chloride and lithium nitride in diglyme: (a) pure CNx, (b) $CN_x$ coated over functionalized Fe@C separated from reaction mixture by magnetic field.

Characterization of Fe@C—CN$_x$ by Fluorescence. Fluorescence measurements were obtained using Horiba Jobin Yvon Fluorolog 3 spectrofluorometer equipped with a single grating monochromator and a photomultiplier tube detector having an accuracy of 0.5 nm. FIG. 7 is the FT-IR analysis of CN$_x$ and Fe@C—CN$_x$ and shows the presence at 807, 1440, 1490 and 1574 cm-1 s-triazine ring modes, while the peaks in the 1000-1350 cm-1 region relate to the C—N stretchings. Also, broad bands of stretching and deformation modes of the NH and NH$_2$ (and possibly OH) appeared at 3342 and 1620 cm$^{-1}$ and a weak band at 2177 cm$^{-1}$ of the C triple bond N stretch were also present.

Example 10

Figure 8A:
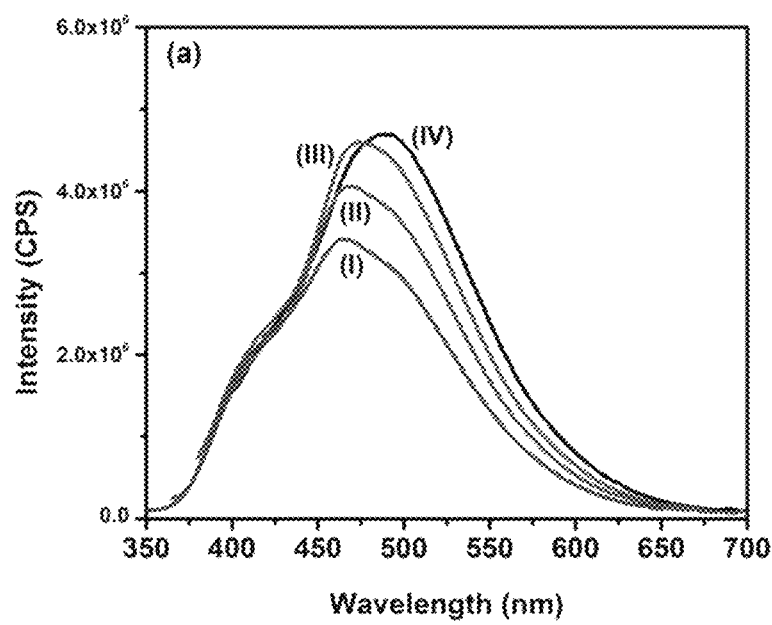
FIG. 8a is an emission spectrum with excitation at different wavelength for pure spherical CNx [(I) 335 nm, (II) 350 nm, (III) 365 nm and (IV) 380 nm].
Figure 8B:
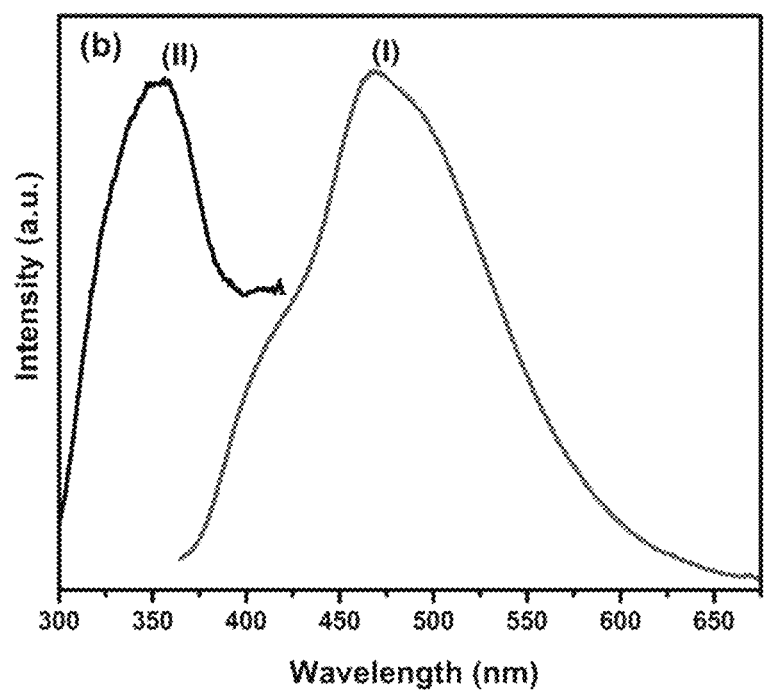
FIG. 8b is an excitation and emission spectrum of spherical CNx at 460 nm and 350 nm respectively [(I) 350 nm and (II) 460 nm].
Figure 8C:
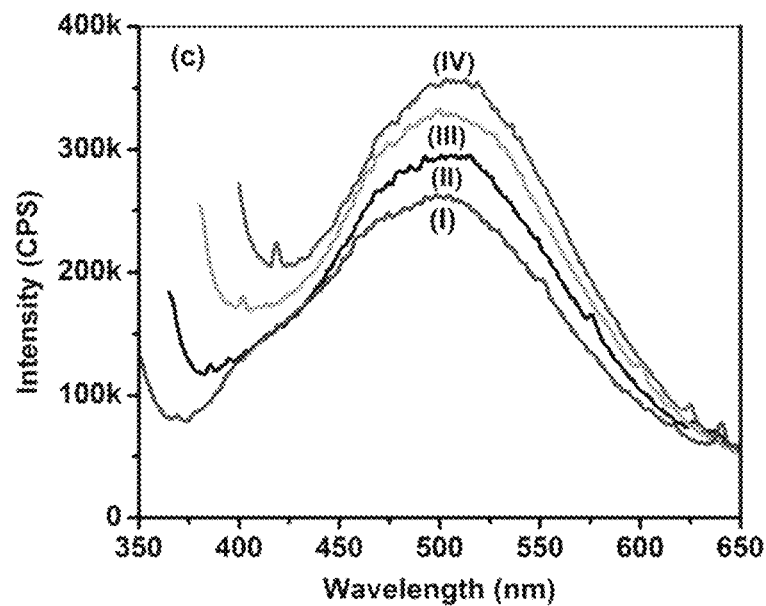
FIG. 8c is an emission spectrum with excitation at different wavelength for pure spherical CNx [(I) 335 nm, (II) 350 nm, (III) 365 nm and (IV) 380 nm].
Figure 8D:
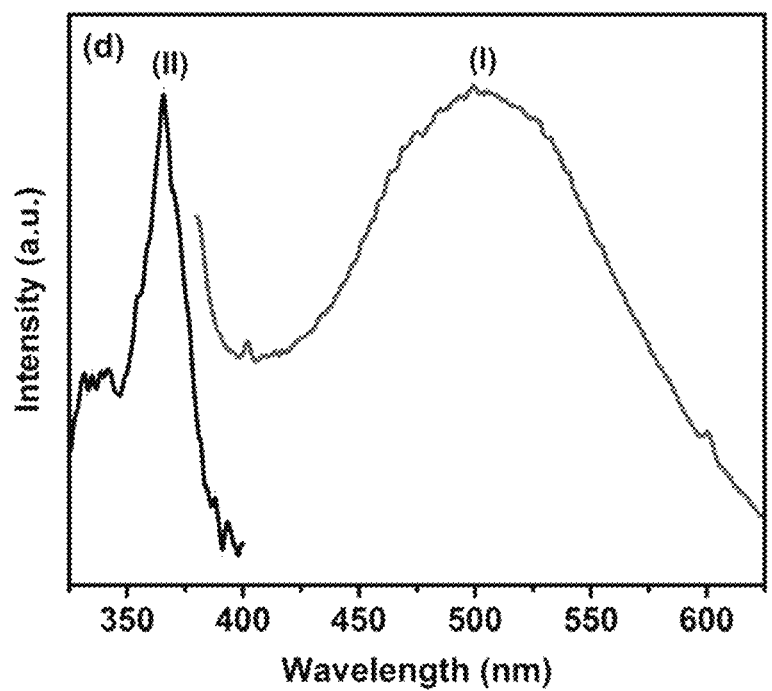
FIG. 8d is an excitation and emission spectrum of spherical CNx at 460 nm and 365 nm respectively [(I) 365 nm and (II) 500 nm].
Figure 9:
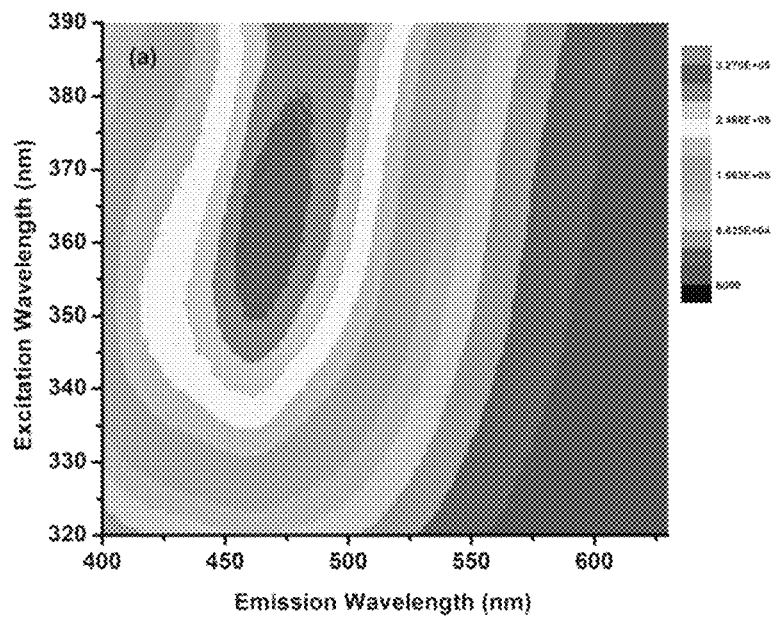
FIG. 9 is a 2-D Fluorescence spectrum of pure spherical CNx (a) and (b) hybrid Fe@C—CNx in solid state mode.
Figure 9:
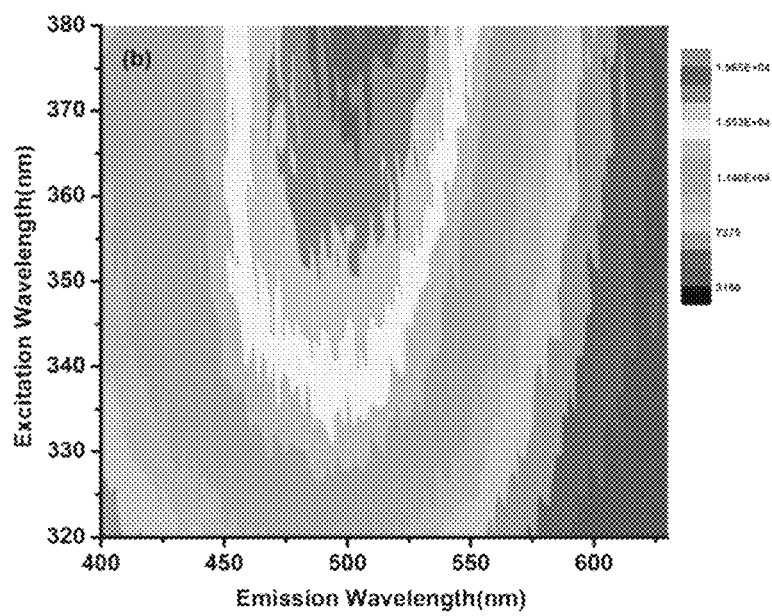

Characterization of Fe@C—CN$_x$ in Solid State Mode with Right Angle Measurements by Fluorescence Absorption. Fluorescence absorption measurements were collected on a Shimadzu UV-3600 UV-VIS-NIR spectrophotometer for spherical CNx versus graphitic CNx. The results showed enhanced fluorescence activity with spherical CNx compared to graphitic CNx, possibly due to the resonance scattering of laser light by spherical particles. The fluorescence activity of Fe@C—CNx was also compared with pure spherical CNx particles. FIG. 8a shows the pure spherical CNx having strong fluorescence signal with maximum emission at 460 nm and emission peak is constant with different excitation wavelength (335, 350, 365 and 380 nm). A sharp excitation spectrum at 350 nm was also observed by using the emission wavelength of 460 nm (FIG. 8b) whereas the Fe@C—CNx hybrid system showed red shift in the emission wavelength at 500 nm with different excitation wavelength (335, 350, 365 and 380 nm) (FIG. 8c). FIG. 8d showed a strong excitation spectrum at 365 nm with 500 nm. This red shift in emission may be attributed to the influential effect of electromagnetic spectrum with the magnetic particles in this hybrid configuration. Further this shift is confirmed by the 2-D fluorescence spectrum of pure spherical CNx (a) and (b) hybrid Fe@C—CNx in solid state mode, illustrated in FIG. 9.

Example 11

Figure 10:
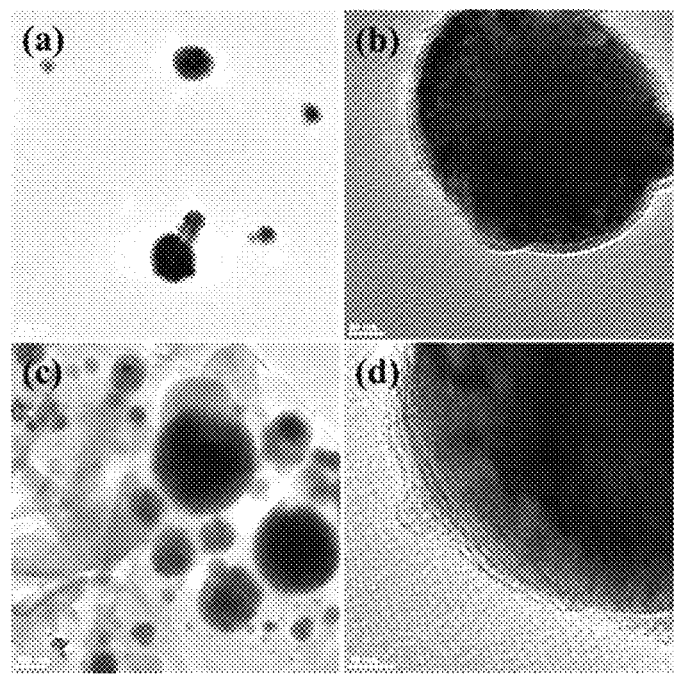
FIG. 10 is a TEM analysis of Fe@C (a & b) and functionalized Fe@C (c & d).

Characterization of Fe@C—CN$_x$ by Transmission Electron Microscopy (TEM). TEM analysis, illustrated in FIG. 10, clearly shows the presence of thick graphitic shell over the Fe core in Fe@C. Further, the core is shown as being preserved after the functionalization process. Some amorphous carbon is deposited over the surface of the particle this is attributed to the thermal decomposition of succinic acid peroxide. This decomposed succinic acid peroxide forms amorphous carbon molecules around the magnetic iron particles. Further the thicknesses of the particles are increased due to functionalization process. FIG. 10 confirms the functionalization process as being mild and an efficient way to introduce the functional groups over the Fe@C. TEM of CN$_x$ coated Fe@C shows the presence of nitrogen and the pure CN$_x$ separated from the reaction mixture shows the formation of spherical CN$_x$. It is also noticed that that these particles also surrounds some of the magnetic particles. In detail TEM analysis shows the presence of extra thick layers around the Fe@C forming the hybrid configuration of Fe@C—CN$_x$.

Example 12

Figure 11A:
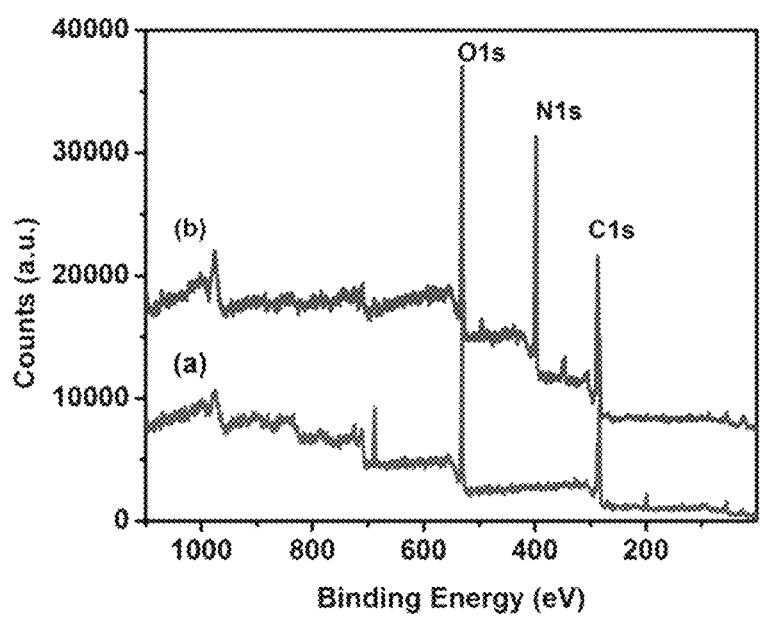
Figure 11B:
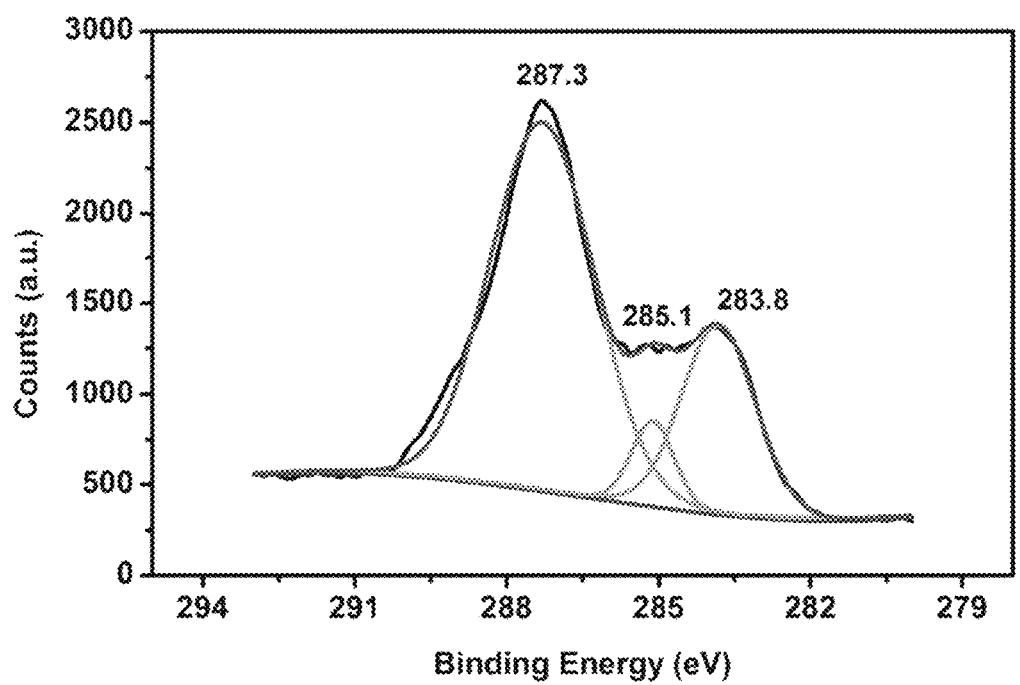
FIG. 11b shows high resolution XPS data for C1s peak and FIG. 11c shows high resolution XPS data for N1s peaks.
Figure 11C:
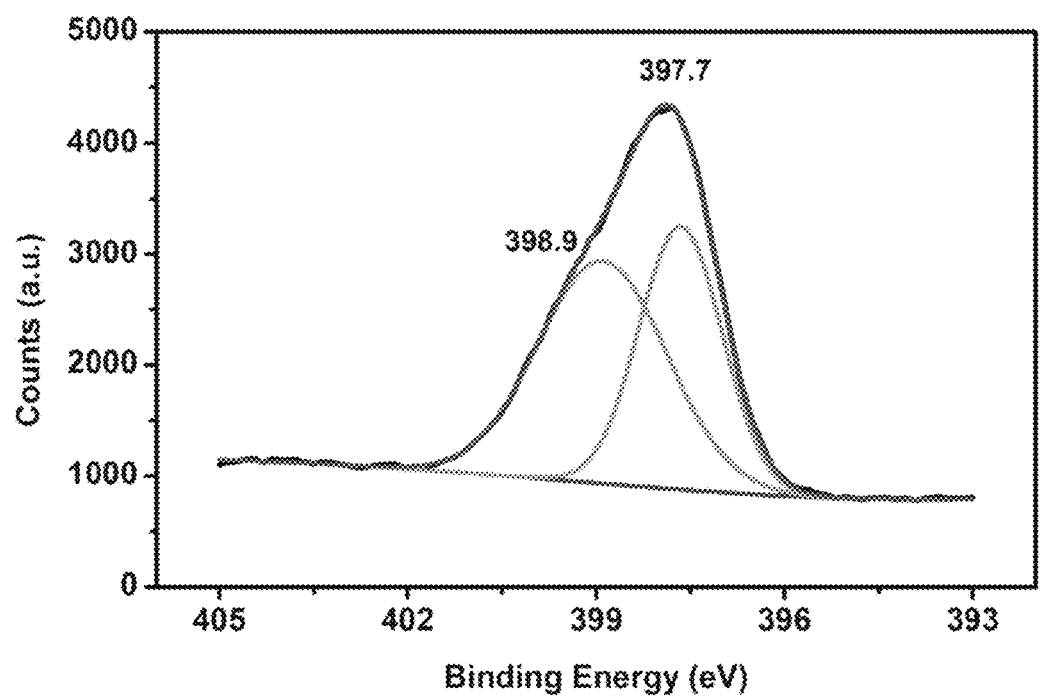

Characterization of Functionalized Fe@C and Fe@C—CN$_x$ by X-ray Photoelectron Spectroscopy (XPS). The survey XPS spectrum of functionalized Fe@C and Fe@C—CN$_x$ is shown in FIG. 11 and indicates the final hybrid material to be composed of carbon and nitrogen. High resolution XPS data for C1s peak (FIG. 11b) and N1s peaks (FIG. 11c) are deconvoluted. From the analysis of C1s spectrum, it is shown the presence of C—C, C—O, and C═N bonds attributed to the 283.8, 285.1, and 287.3 respectively. The deconvoluted N1s peak shows a major peak at 397.7 eV due to the sp$^2$ bonded to carbon, and a shoulder peak at a higher binding energy, 398.9 eV, assigned to sp-bonded nitrogen in the terminal C$\equiv$N groups. The XPS data thus strongly suggest that the graphite-like sp2-bonded structure is most likely for the carbon nitride powders.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

Embodiment 1. A spherical nanoparticle comprising:
(a) a magnetic core comprising iron, nickel or cobalt or alloys thereof;
(b) a carbon shell encapsulating the magnetic core;
(c) at least one organic functional group on the surface of the carbon shell through covalent bonding
(d) a coating of amorphous carbon nitride encapsulating the functionalized carbon shell through chemical reaction Embodiment 2. The spherical nanoparticle of Embodiment 1, wherein the magnetic core comprises iron carbide or metallic iron of zero oxidation state.

Embodiment 3. The spherical nanoparticle of Embodiment 1 or 2, wherein the carbon shell is a graphitic carbon, carbon onions, graphene or graphene oxide.

Embodiment 4. The spherical nanoparticle of any of Embodiments 1 to 3, wherein the at least one organic functional group is luminescent.

Embodiment 5. The spherical nanoparticle of Embodiment 4, wherein the at least one organic functional group is fluorescent.

Embodiment 6. The spherical nanoparticle of any of Embodiments 1 to 5, wherein the at least one organic functional group is a carboxylic, sulfonate, sulfate, sulfosuccinate, thiosulfate, succinate, carboxylate, hydroxyl, glucoside, alkyl, ethoxylate, propoxylate, phosphate, ether, amine, amide, imido or a combination thereof.

Embodiment 7. The spherical nanoparticle of Embodiment 6, wherein the at least one organic functional group is a carboxylic, carboxylate, amino, hydroxyl, alkyl or a maleinimido.

Embodiment 8. The spherical nanoparticle of Embodiment 7, wherein the at least one organic functional group is an alkyl carboxylic acid.

Embodiment 9. The spherical nanoparticle of any of Embodiments 1 to 5, wherein the at least one organic functional group on the carbon shell is —SH, —NH$_2$, —NHCO, —OH, —COOH, —F, —Br, —Cl, —I, CN, SCN, O—Si—R, —H, —R—NH, —R—, —R—S, —COP, —COCl and —SCl.

Embodiment 10. The spherical nanoparticle of any of Embodiments 1 to 9, wherein the coating of the carbon shell encapsulating the magnetic core is from about 1 nm to about 1 micron.

Embodiment 11. The spherical nanoparticle of any of Embodiments 1 to 10, wherein the diameter of the magnetic core is from 5 nm to about 100 nm.

Embodiment 12. The spherical nanoparticle of any of Embodiments 1 to 11, wherein the spherical nanoparticle is dye-free.

Embodiment 13. The spherical nanoparticle of any of Embodiments 1 to 12, wherein the at least one organic functional group is hydrophilic.

Embodiment 14. The spherical nanoparticle of any of Embodiments 1 to 12, wherein the at least one organic functional group is hydrophobic.

Embodiment 15. The spherical nanoparticle of any of Embodiments 1 to 12, wherein the at least one organic functional group is oleophilic.

Embodiment 16. The spherical nanoparticle of any of Embodiments 1 to 14, wherein the nanoparticle has at least two organic functional groups.

Embodiment 17. The spherical nanoparticle of Embodiment 16, wherein (i) one of the at least two organic functional groups is hydrophilic and the other is not hydrophilic; (ii) one of the at least two organic functional groups is hydrophobic and the other is not hydrophobic; or (iii) one of the at least two organic functional groups is oleophilic and the other is not oleophilic.

Embodiment 18. The spherical nanoparticle of Embodiment 16 or 17, wherein the at least two organic functional groups are qualitatively and/or quantitatively distinguishable from each other.

Embodiment 19. A nanoparticle comprising:
(a) a magnetic core of iron carbide or metallic iron of zero oxidation;

(b) a carbon shell encapsulating the magnetic core, wherein the carbon shell is diamond, graphene or graphene oxide;
(c) a carbon nitride encapsulating the carbon shell wherein the carbon nitride is attached to the carbon shell by at least one functional group.

Embodiment 20. The nanoparticle of Embodiment 19, wherein the at least one luminescent functional group is a carboxylic, sulfonate, sulfate, sulfosuccinate, thiosulfate, succinate, carboxylate, hydroxyl, glucoside, alkyl, ethoxylate, propoxylate, phosphate, ether, amine, amide, imido or a combination thereof.

Embodiment 21. The nanoparticle of Embodiment 20, wherein the at least one luminescent functional group is a carboxylic, carboxylate, amino, hydroxyl, alkyne or a maleinimido.

Embodiment 22. The nanoparticle of Embodiment 21, wherein the functional group is an alkyl carboxylic acid.

Embodiment 23. The nanoparticle of any of Embodiments 16 to 19, wherein the coating of carbon nitride on the carbon shell is from about 10 nm to about 1 micron.

Embodiment 24. The nanoparticle of any of Embodiments 19 to 23, wherein the diameter of the magnetic core is from 5 nm micron to about 100 nm.

Embodiment 25. The nanoparticle of any of Embodiments 19 to 24, wherein the at least one luminescent functional group is hydrophilic, hydrophobic or oleophilic.

Embodiment 26. The nanoparticle of any of Embodiments 19 to 25, wherein the nanoparticle has at least two luminescent functional groups.

Embodiment 27. The nanoparticle of Embodiment 26, wherein (i) one of the at least two organic functional groups is hydrophilic and the other is not hydrophilic; (ii) one of the at least two organic functional groups is hydrophobic and the other is not hydrophobic; or (iii) one of the at least two organic functional groups is oleophilic and the other is not oleophilic wherein (i) the at least two organic functional groups are both not hydrophilic; (ii) the at least two organic functional groups are both not hydrophobic; or (iii) the at least two organic functional groups are both not oleophilic.

Embodiment 28. The nanoparticle of Embodiment 26 or 27, wherein the at least two luminescent functional groups are qualitatively and/or quantitatively distinguishable from each other.

Embodiment 29. The nanoparticle of any of Embodiments 1 to 28, wherein the nanoparticle is plasmonic.

Embodiment 30. A plasmonic nanoparticle comprising:
(a) a magnetic core of iron carbide or metallic iron of a zero oxidation state, wherein the diameter of the magnetic core is from about 5 nm to about 100 nm;
(b) a protective carbon shell encapsulating the magnetic core, wherein the thickness of the protective carbon shell is from about 1 nm to about 1 micron;
(c) a luminescent amorphous carbon nitride coating encapsulating the carbon shell wherein the carbon nitride coating is attached to the carbon shell by a alkyl carboxylic acid and wherein the thickness of the amorphous carbon nitride coating is from about 1 nm to about 1 micron.

Embodiment 31. The plasmonic nanoparticle of Embodiment 30, wherein the alkyl carboxylic acid is succinic acid.

Embodiment 32. The plasmonic nanoparticle of Embodiment 30 or 31, further comprising at least one luminescent organic functional group attached to the carbon shell which is qualitatively and/or quantitatively distinguishable from the alkyl carboxylic acid.

Embodiment 33. A composite comprising:
(a) the nanoparticle of any of Embodiments 1 to 32;
(b) a porous adsorbent, wherein the nanoparticle is adsorbed and immobilized into the pores of the porous adsorbent;
(c) a polymeric coating encompassing the adsorbent.

Embodiment 34. The composite of Embodiment 33, wherein the composite is adsorbed onto a water-insoluble adsorbent.

Embodiment 35. The composite of Embodiment 33 or 34, wherein the amount of the nanoparticle in the composite is between from about 0.05 to about 5 weight percent.

Embodiment 36. The composite of Embodiment 34 or 35, wherein the water-insoluble adsorbent is selected from the group consisting of activated carbon, silica particulate, precipitated silica, zeolite, diatomaceous earth, ground walnut shells, fuller's earth and organic synthetic high molecular weight water-insoluble adsorbents.

Embodiment 37. The composite of Embodiment 36, wherein the water-insoluble adsorbent is diatomaceous earth or ground walnut shells.

Embodiment 38. The composite of any of Embodiments 33 to 37, wherein the polymeric coating is a thermosetting resin.

Embodiment 39. The composite of Embodiment 38, wherein the thermosetting resin is polystyrene, a styrene-divinylbenzene copolymer, a polyacrylate, a polyalkylacrylate, a polyacrylate ester, a polyalkylacrylate ester, a modified starch, a polyepoxide, a polyurethane, a polyisocyanate, a phenol formaldehyde resin, a furan resin, or a melamine formaldehyde resin.

Embodiment 40. A process of preparing the nanoparticle of any of Embodiments 1 to 32 comprising:
(a) attaching the least one functional group onto the carbon shell encapsulating the core to render a functionalized carbon encapsulated core;
(b) reacting cyanuric chloride and lithium nitride in the presence of the functionalized carbon encapsulated core to form carbon nitride; and
(c) encompassing the carbon shell with the carbon nitride.

Embodiment 41. The process of Embodiment 40, wherein the cyanuric chloride and lithium nitride are reacted in the presence of the functionalized carbon encapsulated core at a temperature from 50° C. to 175° C. in an organic solvent.

Embodiment 42. The process of Embodiment 41, wherein the organic solvent is diglyme.

Embodiment 43. The process of any of Embodiments 40 to 42, wherein the at least one functional group on the functionalized carbon encapsulated core is a alkyl carboxylic acid.

Embodiment 44. The process of Embodiment 43, wherein the alkyl carboxylic acid is succinic acid.

Embodiment 45. A process of preparing a spherical magnetic nanoparticle having an exterior coating of carbon nitride comprising:
(a) encapsulating a magnetic core with a carbon shell, wherein the magnetic core comprises iron, nickel or cobalt or alloys thereof and wherein the thickness of the carbon shell is between from about 1 nm to about 100 nm;
(b) attaching onto the carbon shell a functional group to render a functionalized carbon encapsulated core; and
(c) reacting cyanuric chloride and lithium nitride in the presence of the functionalized carbon encapsulated core.

Embodiment 46. The process of Embodiment 45, wherein the magnetic core comprises iron carbide or metallic iron of zero oxidation state.

Embodiment 47. The process of Embodiment 45 or 46, wherein the carbon shell is diamond, graphene or graphene oxide.

Embodiment 48. The process of any of Embodiments 45 to 47, wherein the at least one organic functional group is luminescent.

Embodiment 49. The process of Embodiment 48, wherein the at least one organic functional group is fluorescent.

Embodiment 50. The process of any of Embodiment 45 to 49 wherein the at least one functional group is a carboxylic, sulfonate, sulfate, sulfosuccinate, thiosulfate, succinate, carboxylate, hydroxyl, glucoside, alkyl, ethoxylate, propoxylate, phosphate, ether, amine, amide, imido or a combination thereof.

Embodiment 51. The process of Embodiment 50, wherein the at least one functional group is a carboxylic, carboxylate, amino, hydroxyl, alkyne or a maleinimido.

Embodiment 52. The process of Embodiment 51, wherein the at least one functional group is a alkyl carboxylic acid.

Embodiment 53. A process of preparing a fluorescent, plasmonic and magnetic nanoparticle comprising the steps of:
(a) coating a carbon shell onto a magnetic material and encompassing the magnetic material with the carbon shell, wherein the thickness of the carbon shell is between from about 1 nm to about 1 micron and further wherein the magnetic material is iron carbide or iron having a zero oxidation state;
(b) attaching at least one functional group onto the carbon shell; and
(b) reacting cyanuric chloride and lithium nitride in the presence of the product of step (b) and attaching amorphous carbon nitride onto the at least one functional group.

Embodiment 54. The process of Embodiment 53, wherein the cyanuric chloride and lithium nitride are reacted in the presence of the product of step (b) at a temperature from 50° C. to 175° C. in an organic solvent.

Embodiment 55. The process of Embodiment 54, wherein the organic solvent is diglyme.

Embodiment 56. The process of any of Embodiments 53 to 55, wherein the at least one functional group is a carboxylic, carboxylate, amino, hydroxyl, alkyne or an maleinimido.

Embodiment 57. The process of Embodiment 56, wherein the at least one functional group is an alkyl carboxylic acid.

Embodiment 58. A method of treating a well or a subterranean formation penetrated by the well, the method comprising:
(a) introducing into the well the composite of any of Embodiments 33 to 39;
(b) degrading or solubilizing the polymeric coating into a fluid within the well;
(c) releasing the nanoparticle from the adsorbent into the fluid; and
(d) recovering the fluid containing the nanoparticle from the well.

Embodiment 59. A method of fracturing a subterranean formation penetrated by a well which comprises:
(a) pumping into the well a fracturing fluid at a pressure sufficient to enlarge or create a fracture in the formation, wherein the fracturing fluid comprises the composite of any of Embodiments 33 to 39;
(b) slowly solubilizing the polymer coating encompassing the adsorbent;
(c) releasing the nanoparticle into a fluid within the well;
(d) concentrating the nanoparticle at the surface of the well by subjecting the fluid to a magnetic field; and
(e) subjecting a sample containing the concentrated nanoparticle to luminescence.

Embodiment 60. A method of enhancing the productivity of hydrocarbon containing fluids from a subterranean formation penetrated by a well comprising:
(a) pumping into the well a fluid comprising the composite of any of Embodiments 33 to 39; and
(b) identifying the composite in fluids produced from the well by qualitatively and/or quantitatively measuring the amount of functional group in the fluid by luminescence.

Embodiment 61. The method of Embodiment 60, wherein the fluid is pumped into the well during a sand control operation.

Embodiment 62. The method of Embodiment 61, wherein the formation is an unconsolidated formation and further wherein the sand control operation is simultaneously conducted while the unconsolidated formation is hydraulically fractured Embodiment 63. A method of fracturing multiple zones of a subterranean formation penetrated by a well which comprises:
(a) pumping into each zone of the formation to be fractured a fracturing fluid, wherein the fracturing fluid pumped into each zone comprises the nanoparticles of any of Embodiments 1 to 32 and further wherein the functional group on the nanoparticles introduced into each zone is qualitatively and quantitatively distinguishable;
(b) enlarging or creating a fracture in the formation;
(c) recovering fluid from at least one of the multiple zones; and
(d) identifying the zone within the subterranean formation from which the recovered fluid was produced by identifying the functional group of the nanoparticles in the recovered fluid.

Embodiment 64. The method of Embodiment 63, wherein the functional group is hydrophilic and/or oleophilic.

Embodiment 65. A method of monitoring the production of fluids produced in multiple productive zones of a subterranean formation penetrated by a well, the method comprising:
(a) pumping fracturing fluid into the multiple productive zones at a pressure sufficient to enlarge or create fractures in each of the multiple productive zones, wherein the fracturing fluid comprises nanoparticles of any of Embodiment 1 to 32, wherein the nanoparticles pumped into each zone contain a qualitatively and/or quantitatively distinguishable functional group; and
(b) monitoring the amount of fluids produced from at least one of the multiple productive zones from the functional groups in the produced fluid.

Embodiment 66. The method of Embodiment 65, wherein the monitoring is in real time.

Embodiment 67. The method of Embodiment 65, wherein the monitoring is conducted on the fly.

Embodiment 68 . The method of Embodiment 65, further comprising determining the presence of dispersed oil in produced water from the organic functional groups.

Embodiment 69. The method of any of Embodiment 65 to 68, wherein at least a portion of the organic functional groups are hydrophilic and/or oleophilic.

Embodiment 70. A method for determining water breakthrough in a production well associated with one or more injector wells, the method comprising:
(a) injecting an aqueous fluid comprising the nanoparticles of any of Embodiments 1 to 32 as nanoparticle into an injector well;
(b) flowing the aqueous fluid from the injector well into the production well;
(c) producing fluid from the production well;
(d) determining water breakthrough in the production well by qualitatively determining the presence or quantitatively measuring the amount of the functional groups in the produced fluid.

Embodiment 71. The method of Embodiment 70, wherein at least a portion of the surface of the nanoparticles is hydrophilic and/or oleophilic by the functional groups on the carbon shell.

Embodiment 72. A method of increasing hydrocarbon production from a production well penetrating a hydrocarbon-bearing reservoir, wherein more than one injection well is associated with the production well, the method comprising:
(a) injecting an aqueous fluid having a water soluble nanoparticle comprising the nanoparticles of any of Embodiments 1 to 32 into the more than one injection well and maintaining pressure in the hydrocarbon-bearing reservoir above the bubble point of the hydrocarbons in the reservoir, wherein the aqueous fluid pumped into each of the injection wells contains qualitatively distinguishable functional groups on the surface of the carbon shell;
(b) identifying from hydrocarbons recovered from the production well, upon water breakthrough in the production well, the injection well into which the breakthrough water was injected by qualitatively determining the presence of the functional groups in the recovered hydrocarbons; and
(c) shutting off the injector well identified in step (b).

Although the foregoing description contains many specifics, these are not to be construed as limiting the scope of the disclosure, but merely as providing certain embodiments. Similarly, other embodiments may be devised that do not depart from the scope of the disclosure. For example, features described herein with reference to one embodiment also may be provided in others of the embodiments described herein. The scope of the disclosure is, therefore, indicated and limited only by the appended claims and their legal equivalents, rather than by the foregoing description. All additions, deletions, and modifications to embodiments of the disclosure, as described and illustrated herein, which fall within the meaning and scope of the claims, are encompassed by the disclosure.

What is claimed is:

1. A spherical nanoparticle comprising:
(a) a magnetic core comprising iron, nickel or cobalt or alloys thereof;
(b) a carbon shell encapsulating magnetic core;
(c) at least one organic functional group on the surface of the carbon shell through covalent bonding; and
(d) a coating of amorphous carbon nitride encapsulating the functionalized carbon shell through chemical reaction.

2. The spherical nanoparticle of claim 1, wherein the magnetic core comprises iron carbide or metallic iron of zero oxidations state.

3. The spherical nanoparticle of claim 1, wherein the carbon shell is a graphitic carbon, carbon onions, graphene or graphene oxide.

4. The spherical nanoparticle of claim 1, wherein the at least one organic functional group is a carboxylic, sulfonate, sulfate, sulfosuccinate, thiosulfate, succinate, carboxylate, hydroxyl, glucoside, alkyl, ethoxylate, propoxylate, phosphate, ether, amine, amide, imido or a combination thereof.

5. The spherical nanoparticle of claim 1, wherein the at least one organic functional group is —SH, —NH$_2$, —NHCO, —OH, —COOH, —F, —Br, —Cl, —I, CN, SCN, O—Si—R, —H, —R—NH, —R—, —R—S, —COP, —COCl and —SCl.

6. The spherical nanoparticle of claim 1, wherein the coating of the carbon shell encapsulating the magnetic core is from about 1 nm to about 1 micron.

7. The spherical nanoparticle of claim 1, wherein the diameter of the magnetic core is from 5 nm to about 100 nm.

8. The spherical nanoparticle of claim 1, wherein the at least one organic functional group is hydrophilic, hydrophobic and/or oleophilic.

9. The spherical nanoparticle of claim 1, wherein the nanoparticle has at least two organic functional groups which are qualitatively and/or quantitatively distinguishable from each other.

10. The spherical nanoparticle of claim 9, wherein (i) one of the at least two organic functional groups is hydrophilic and the other is not hydrophilic; (ii) one of the at least two organic functional groups is hydrophobic and the other is not hydrophobic; or (iii) one of the at least two organic functional groups is oleophilic and the other is not oleophilic.

11. The spherical nanoparticle of claim 9, wherein the at least two organic functional groups are luminescent.

12. The spherical nanoparticle of claim 1 prepared by:
(a) attaching the least one organic functional group onto the carbon shell encapsulating the magnetic core to render a functionalized carbon encapsulated core;
(b reacting cyanuric chloride and lithium nitride in the presence of the functionalized carbon encapsulated core to form carbon nitride; and
(c) encompassing the carbon shell with the carbon nitride.

13. The spherical nanoparticle of claim 1, produced by:
(a) coating the carbon shell onto the magnetic core and encompassing the magnetic core with the carbon shell, wherein the thickness of the carbon shell is between from about 1 nm to about 1 micron and further wherein the magnetic core is iron carbide or iron having A zero oxidation state;
(b) attaching an alkyl carboxylic acid onto the carbon shell; and
(c) reacting cyanuric chloride and lithium nitride in the presence of the product of set (b) and attaching amorphous carbon nitride onto the alkyl carboxylic acid.

14. The spherical nanoparticle of claim 1, wherein the at least one organic functional group is a carboxylic, carboxylate, amino, hydroxyl, alkyne or a maleinimido group.

15. A plasmonic nanoparticle comprising:
(a) a magnetic core of iron carbide or metallic iron of a zero oxidation state, wherein the diameter of the magnetic core is from about 5 nm to about 100 nm;
(b) a protective carbon shell encapsulating the magnetic core, wherein the thickness of the protective carbon shell is from about 1 nm to about 1 micron; and
(c) a luminescent amorphous carbon nitride coating encapsulating the carbon shell wherein the carbon nitride coating is attached to the carbon shell by an alkyl carboxylic acid and wherein the thickness of the amorphous carbon nitride coating is from about 1 nm to about 1 micron.

16. The plasmonic nanoparticle of claim 15, further comprising at least one luminescent organic functional group attached to the carbon shell which is qualitatively and/or quantitatively distinguishable from the alkyl carboxylic acid.

17. A composite comprising:
(a) the nanoparticle of claim 1;
(b) a porous adsorbent, wherein the nanoparticle is adsorbed and immobilized into the pores of the porous adsorbent; and
(c) a polymeric coating encompassing the adsorbent.

18. The composite of claim 17, wherein the composite is adsorbed onto a water-insoluble adsorbent.

19. The composite of claim 18, wherein the water-insoluble adsorbent is selected from the group consisting of activated carbon, silica particulate, precipitated silica, zeolite, diatomaceous earth, ground walnut shells, fuller's earth and organic synthetic high molecular weight water-insoluble adsorbents.

20. The composite of claim 17, wherein the polymeric coating is a thermosetting resin.

21. The composite of claim 19, wherein the water-insoluble adsorbent is diatomaceous earth or ground walnut shells.

22. The composite of claim 20, wherein the thermosetting resin is selected from the group consisting of polystyrene, a styrene-divinylbenzene copolymer, a polyacrylate, a polyalkylacrylate, a polyacrylate ester, a polyalkylacrylate ester, a modified starch, a polyepoxide, a polyurethane, a polyisocyanate, a phenol formaldehyde resin, furan resin, a melamine formaldehyde resin and mixtures thereof.

23. The, composite of claim 17, wherein the amount of nanoparticle in the composite is between from about 0.05 to about 5 weight percent.

* * * * *